US011985234B2

United States Patent
McCarty et al.

(10) Patent No.: US 11,985,234 B2
(45) Date of Patent: May 14, 2024

(54) SECURE QUANTUM SWAP

(71) Applicant: Accenture Global Solutions Limited, Dublin (IE)

(72) Inventors: Benjamin Glen McCarty, Washington, DC (US); Amin Hassanzadeh, Arlington, VA (US)

(73) Assignee: Accenture Global Solutions Limited, Dublin (IE)

( * ) Notice: Subject to any disclaimer, the term of this patent is extended or adjusted under 35 U.S.C. 154(b) by 204 days.

(21) Appl. No.: 17/744,323

(22) Filed: May 13, 2022

(65) Prior Publication Data

US 2023/0370254 A1    Nov. 16, 2023

(51) Int. Cl.
*H04L 29/06* (2006.01)
*G06N 10/40* (2022.01)
*H04L 9/08* (2006.01)

(52) U.S. Cl.
CPC .......... *H04L 9/0852* (2013.01); *G06N 10/40* (2022.01)

(58) Field of Classification Search
CPC .............................. H04L 9/0852; G06N 10/40
See application file for complete search history.

(56) References Cited

U.S. PATENT DOCUMENTS

| | | | |
|---|---|---|---|
| 11,516,190 B1 * | 11/2022 | McCarty | H04L 9/0858 |
| 2002/0106084 A1 | 8/2002 | Azuma et al. | |
| 2020/0394544 A1 * | 12/2020 | Low | G16C 10/00 |
| 2021/0272001 A1 * | 9/2021 | Smelyanskiy | G06N 10/00 |
| 2022/0027773 A1 * | 1/2022 | Smelyanskiy | G06N 5/01 |
| 2022/0101165 A1 * | 3/2022 | Gwinner | G06N 10/00 |
| 2023/0067766 A1 * | 3/2023 | McCarty | H04L 9/0858 |

OTHER PUBLICATIONS

Extended Search Report in European Appln. No. 22185339.3, dated Dec. 9, 2022, 8 pages.
Johansson et al., "Quantum Simulation Logic, Oracles, and the Quantum Advantage," CoRR, submitted on May 13, 2019, arXiv:1905.05082v1, 48 pages.
Liu et al., "A quantum protocol for private substitution problem," Quantum Information Processing, May 3, 2021, 20:161, 11 pages.

* cited by examiner

*Primary Examiner* — Baotran N To
(74) *Attorney, Agent, or Firm* — Fish & Richardson P.C.

(57) ABSTRACT

Methods, systems and apparatus for implementing a secure quantum swap operation on a first and second qubit. In one aspect a method includes establishing, by a first party and with a second party, an agreement to use a secure swap protocol; performing the quantum swap operation, comprising, for each two-qubit gate included in the quantum swap operation: performing, by the first party and according to the secure swap protocol, a respective preceding quantum gate cipher on the first qubit; performing, by the first party and the second party, the two-qubit gate on the first qubit and the second qubit; and performing, by the first party and according to the secure swap protocol, a respective succeeding quantum gate cipher on the first qubit. The preceding and succeeding quantum gate ciphers comprise computational bases that anti-commute with a computational basis of the two-qubit gate across a second axis of the Bloch sphere.

20 Claims, 14 Drawing Sheets

SECURE QUANTUM SWAP

TECHNICAL FIELD

This specification relates to the fields of cryptography, computer security, and quantum computing.

BACKGROUND

Classical computers have memories made up of bits, where each bit can represent either a zero or a one. Quantum computers maintain sequences of quantum bits, called qubits, where each quantum bit can represent a zero, one or any quantum superposition of zeros and ones. Quantum computers operate by setting qubits in an initial state and controlling the qubits, e.g., according to a sequence of quantum logic gates. A quantum logic gate is a quantum circuit operating on a number of qubits. A SWAP gate is a quantum logic gate that operates on two qubits and swaps the respective states of the two qubits.

SUMMARY

This specification describes systems, methods, devices, and other techniques for implementing secure quantum SWAP gates.

In general, one innovative aspect of the subject matter described in this specification can be implemented in a method for implementing a quantum swap operation on a first qubit and a second qubit. The method includes establishing, by a first party and with a second party, an agreement to use a secure swap protocol to perform the quantum swap operation; performing, by the first party and with the second party, the quantum swap operation, comprising, for each two-qubit gate included in the quantum swap operation: performing, by the first party and according to the secure swap protocol, a respective preceding quantum gate cipher on the first qubit, wherein the preceding quantum gate cipher comprises a computational basis that anti-commutes with a computational basis of the two-qubit gate across a first axis of the Bloch sphere; performing, by the first party and the second party, the two-qubit gate on the first qubit and the second qubit; and performing, by the first party and according to the secure swap protocol, a respective succeeding quantum gate cipher on the first qubit, wherein the succeeding quantum gate cipher comprises a computational basis that anti-commutes with a computational basis of the two-qubit gate across a second axis of the Bloch sphere.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the method further includes, after establishing the agreement to use the secure swap protocol to perform the quantum swap operation, performing, by the first party, a first commutation correction quantum operation to the first qubit, wherein the first commutation correction quantum operation corrects erroneous rotations of the first qubit.

In some implementations the method further comprises, after performing the quantum swap operation, performing, by the first party, a second commutation correction quantum operation to the first qubit, wherein the second commutation correction quantum operation corrects erroneous rotations of the first qubit.

In some implementations the method further comprises, prior to implementing the quantum swap operation: defining an initial quantum circuit with initial quantum gate ciphers; adding quantum gates to the initial quantum gate ciphers to define an intermediate quantum circuit, wherein the intermediate quantum circuit is represented by a matrix with one of multiple acceptable forms, wherein a matrix has an acceptable form if the matrix i) includes four non-zero unitary-valued elements and twelve zero elements and ii) each row and column of the matrix includes one non-zero unitary-valued element.

In some implementations the method further comprises adding correction quantum operations to the intermediate quantum circuit to produce a correct quantum circuit, wherein performing the correct quantum circuit implements a correct quantum swap operation.

In some implementations performing, by the first party, the two-qubit gate, comprises synchronizing with the second party to perform the two-qubit gate.

In some implementations the preceding quantum gate ciphers and the succeeding quantum gate ciphers performed by the first party are unknown to the second party.

In some implementations the preceding quantum gate ciphers and the succeeding quantum gate ciphers each comprise quantum gates that implement 120 degree and 180 degree rotations.

In some implementations the preceding quantum gate ciphers and the succeeding quantum gate ciphers vary for each two-qubit gate included in the quantum swap operation.

In some implementations the method further comprises performing, by the second party and with the first party, the quantum swap operation, comprising, for each two-qubit gate included in the quantum swap operation: performing, by the second party and according to the secure swap protocol, a respective preceding quantum gate cipher on the second qubit, wherein the preceding quantum gate cipher comprises a computational basis that anti-commutes with a computational basis of the two-qubit gate across a first axis of the Bloch sphere; performing, by the second party and with the first party, the two-qubit gate; and performing, by the second party and according to the secure swap protocol, a respective succeeding quantum gate cipher on the second qubit, wherein the succeeding quantum gate cipher comprises a computational basis that anti-commutes with a computational basis of the two-qubit gate across a second axis of the Bloch sphere.

In some implementations the agreement to use a secure swap protocol to perform the quantum swap operation is established using a secure private channel.

In some implementations the quantum swap operation comprises a SWAP gate or an iSWAP gate.

The subject matter described in this specification can be implemented in particular ways so as to realize one or more of the following advantages.

The presently described secure swap protocols enable the states of two qubits to be swapped with reduced risk that an eavesdropper intercepts the qubits and learns the quantum information encoded in the qubits and/or makes qubit measurement outcomes predictable. The quantum information can remain confidential, its integrity protected. Accordingly, the confidentiality and integrity of quantum protocols, quantum algorithms or quantum systems that require swap operations is improved.

In addition, the presently described secure swap protocols can be used to improve secrecy and mitigate tampering or attacks in a wide variety of applications and settings including quantum symmetry breaking algorithms, e.g., quantum superdense coding and quantum teleportation, quantum internet, quantum repeaters, and quantum routers.

In addition, the presently described secure swap protocols include quantum computing operations that can be chosen to be universal, elementary, e.g., including only single or two-qubit gates, and/or in the Clifford-group. Expensive operations, e.g., implementations of T gates are not required. Implementations of the quantum computations required to implement the secure swap protocols can therefore be computationally stable, efficient and quantum hardware agnostic.

In addition, the presently described secure swap protocols are compatible with known modalities of exchange interactions.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A SWAP gate is a two-qubit quantum gate that swaps the states of two qubits. For example, application of a SWAP gate to a first qubit in a zero (or one) state and a second qubit in a zero (or one) state does not affect the state of each qubit, e.g., the states |00>, |11> are transformed to |00>, |11>, respectively. However, application of a SWAP gate to a first qubit in a zero (or one) state and a second qubit in a one (or zero) state swaps the state of each qubit, e.g., the states |01>, |10> are transformed to |10>, |01>, respectively. With respect to the basis |00>, |01>, |10>, |11> the SWAP gate can be represented by the matrix given in Equation (1) below.

$$SWAP = \begin{pmatrix} 1 & 0 & 0 & 0 \\ 0 & 0 & 1 & 0 \\ 0 & 1 & 0 & 0 \\ 0 & 0 & 0 & 1 \end{pmatrix}. \tag{1}$$

The iSWAP gate can be represented by the matrix given by Equation (2) below.

$$iSWAP = \begin{pmatrix} 1 & 0 & 0 & 0 \\ 0 & 0 & i & 0 \\ 0 & i & 0 & 0 \\ 0 & 0 & 0 & 1 \end{pmatrix}. \tag{2}$$

The SWAP gate (or iSWAP gate) is used as the default standard to exchange information encoded in two qubits. Many quantum protocols and algorithms use the SWAP gate to exchange quantum information and/or communicate information encoded in qubits, e.g., when sharing an entangled qubit, including quantum superdense coding protocols and quantum teleportation protocols.

Figure 1:
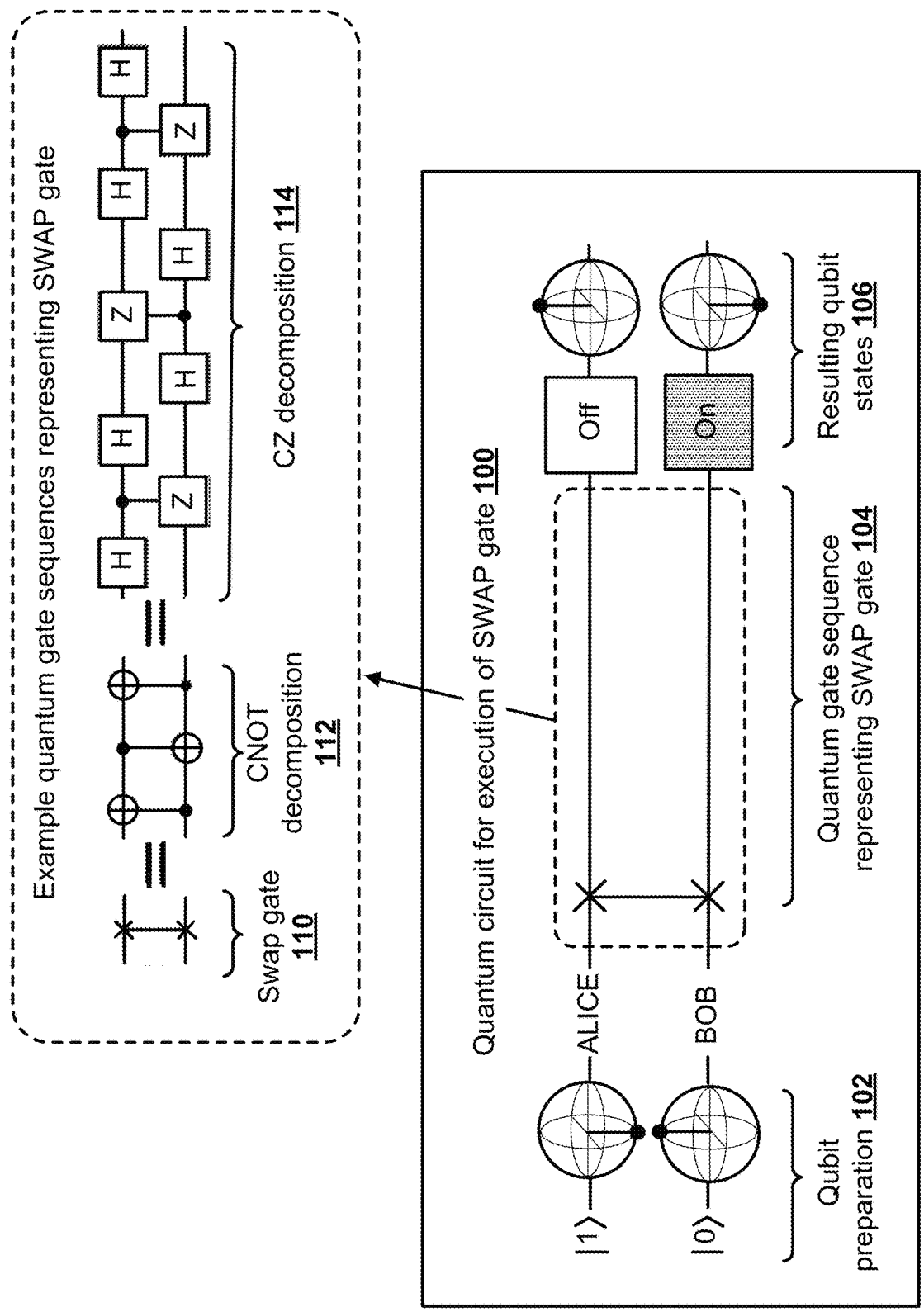
FIG. 1 shows an example quantum circuit for execution of a SWAP gate.

FIG. 1 shows an example quantum circuit 100 for execution of a SWAP gate. During a qubit preparation phase 102, a first party (Alice) and a second party (Bob) each prepare their qubit in a respective quantum state. For example, the first party and/or second party can initialize their qubits in respective quantum states or perform one or more other quantum operations, e.g., as part of a quantum computation, to prepare the qubits in respective quantum states. In the example shown in FIG. 1, the first party Alice prepares her qubit in a one state and the second party Bob prepares his qubit in a zero state.

A sequence of single and/or two-qubit quantum gates 104 that realize the SWAP gate are then applied to the prepared qubits. The particular sequence of quantum gates that are applied to achieve the SWAP can vary based on the type of quantum computer being used to implement the quantum circuit 100 and its available resources. For example, the SWAP gate 110 can be decomposed into multiple controlled-NOT gates. In these examples the sequence of quantum gates 104 can include three controlled-NOT gates 112. As another example, since current and near term quantum devices are typically limited to measurement and exchange interactions on the Z axis of the Bloch sphere, the SWAP gate 110 can be decomposed into multiple controlled-Z gates 114. In these examples, the sequence of quantum gates can include: a first Hadamard gate applied to a first qubit, a first controlled Z gate applied to the first qubit and a second qubit, where the first qubit acts as the control, a second Hadamard gate applied to the first qubit, a third Hadamard gate applied to the second qubit, a second controlled Z gate applied to the first qubit and a second qubit, where the second qubit acts as the control, a fourth Hadamard gate applied to the second qubit, a fifth Hadamard gate applied to the first qubit, a third controlled Z gate applied to the first qubit and a second qubit, where the first qubit acts as the control, and a sixth Hadamard gate applied to the first qubit.

Application of the sequence of quantum gates 104 that realize the SWAP gate 110 swaps the states of Alice and Bob's qubits. The resulting qubit states 106 show that Alice's qubit is now in a zero state and Bob's qubit is in a one state.

Figure 2:
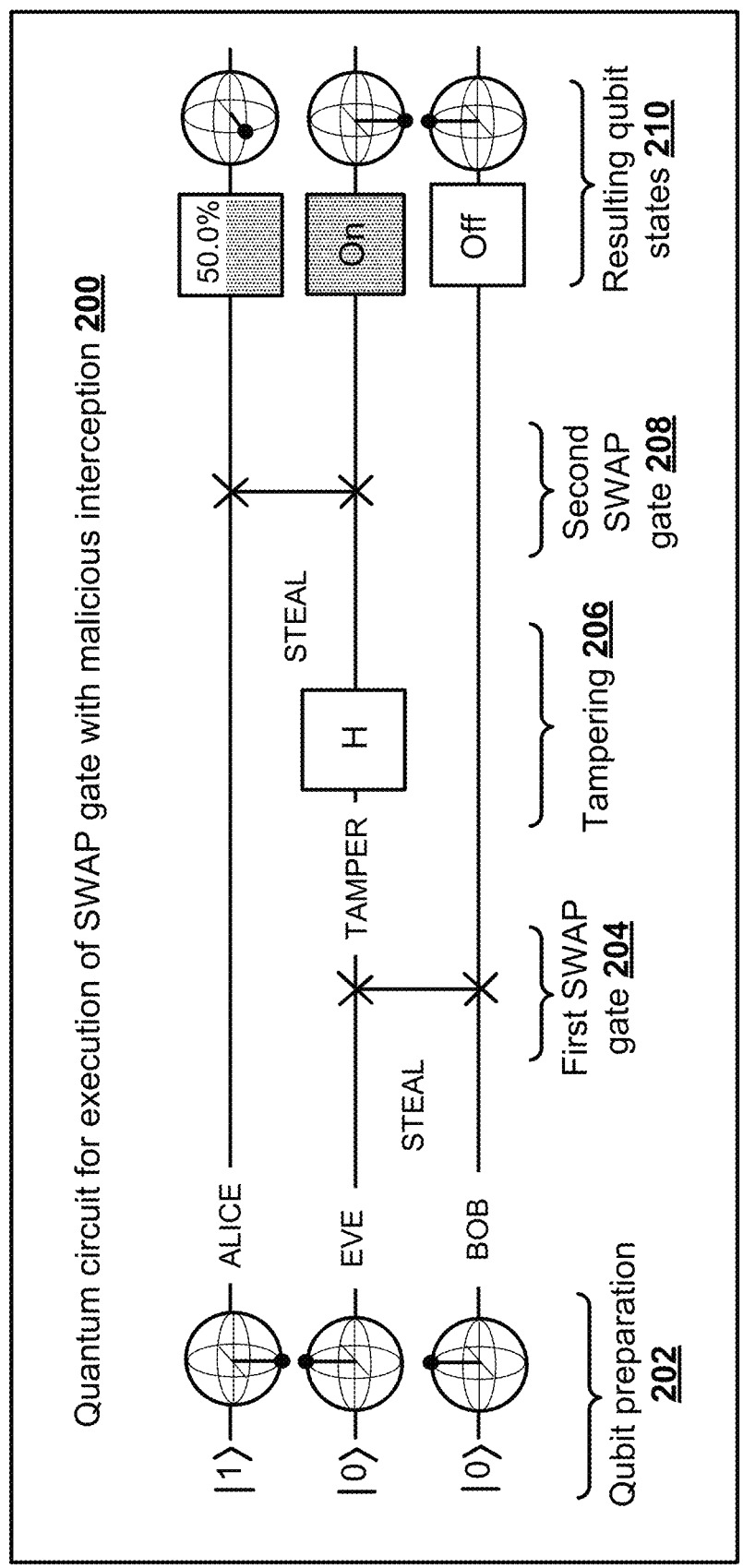
FIG. 2 shows an example quantum circuit for execution of a SWAP gate with malicious interception.

FIG. 1 shows how the SWAP gate is intended to work, e.g., absent errors or tampering. However, in some implementations an adversary can intercept qubits during a SWAP operation and cause an erroneous swap. FIG. 2 shows an example quantum circuit 200 for execution of a SWAP gate with malicious interception. During a qubit preparation phase 202 Alice and Bob prepare their respective qubits in respective quantum states, as described above with reference to FIG. 1. In the example shown in FIG. 2, Alice prepares her qubit in a one state and Bob prepares his qubit in a zero state. In addition, an adversary Eve prepares her qubit in a zero state.

Ideally, Alice and Bob would now perform complementary quantum gate operations on their respective qubits to implement the SWAP gate, e.g., perform the respective quantum gates from the sequence of quantum gates 104 shown in FIG. 1. However, the SWAP gate protocol shown in FIG. 1 has no mechanism that authenticates or authorizes who Alice and Bob are swapping with, nor can it defend against malicious SWAP operations. For example, as shown in FIG. 2, Eve can steal the information stored in Bob's qubit by performing complementary quantum gate operations on her qubit to implement a SWAP gate 204 with Bob (unknown to Bob, who would think that he was performing a swap with Alice). Eve could then tamper 206 with the results of the SWAP gate 204, e.g., by applying a Hadamard gate to her qubit to place her qubit in a superposition state, and perform complementary quantum gate operations on her qubit to implement a SWAP gate 208 with Alice (unknown to Alice, who would think that she is performing a swap with Bob).

After both Alice and Bob perform the complementary quantum gate operations on their respective qubits—albeit with Eve and not each other—they will assume that they have successfully swapped the states of their qubits. However, because of the tampering 206, the resulting qubit states 210 will not be accurate. Indeed, in this example neither Alice nor Bob have swapped the state of their qubit. Alice's qubit is in a superposition state and not a zero state. Bob's qubit is in a zero state and not a one state. Further, even if Alice and Bob could determine post-SWAP that Eve had intercepted the SWAP, the information stored in the state of Bob's qubit would not be retrievable—Eve has already successfully stolen it.

This specification describes modular, asymmetric protocols for implementing a secure SWAP gate using secret quantum gate ciphers. Under the presently described secure swap protocols, Alice and Bob each perform their half of a SWAP gate in secret using anti-commutating quantum gate ciphers and/or commutation correction operations. This mitigates an adversary Eve from intercepting a qubit during the SWAP operation and/or causing malicious swaps. In addition, under the presently described SWAP protocols, if an adversary Eve attempts to intercept a qubit during the Secure SWAP, Eve will not receive a changed qubit state that has changed during the false-swap and will not receive the Qubit Alice intended to swap with Bob.

Figure 3:
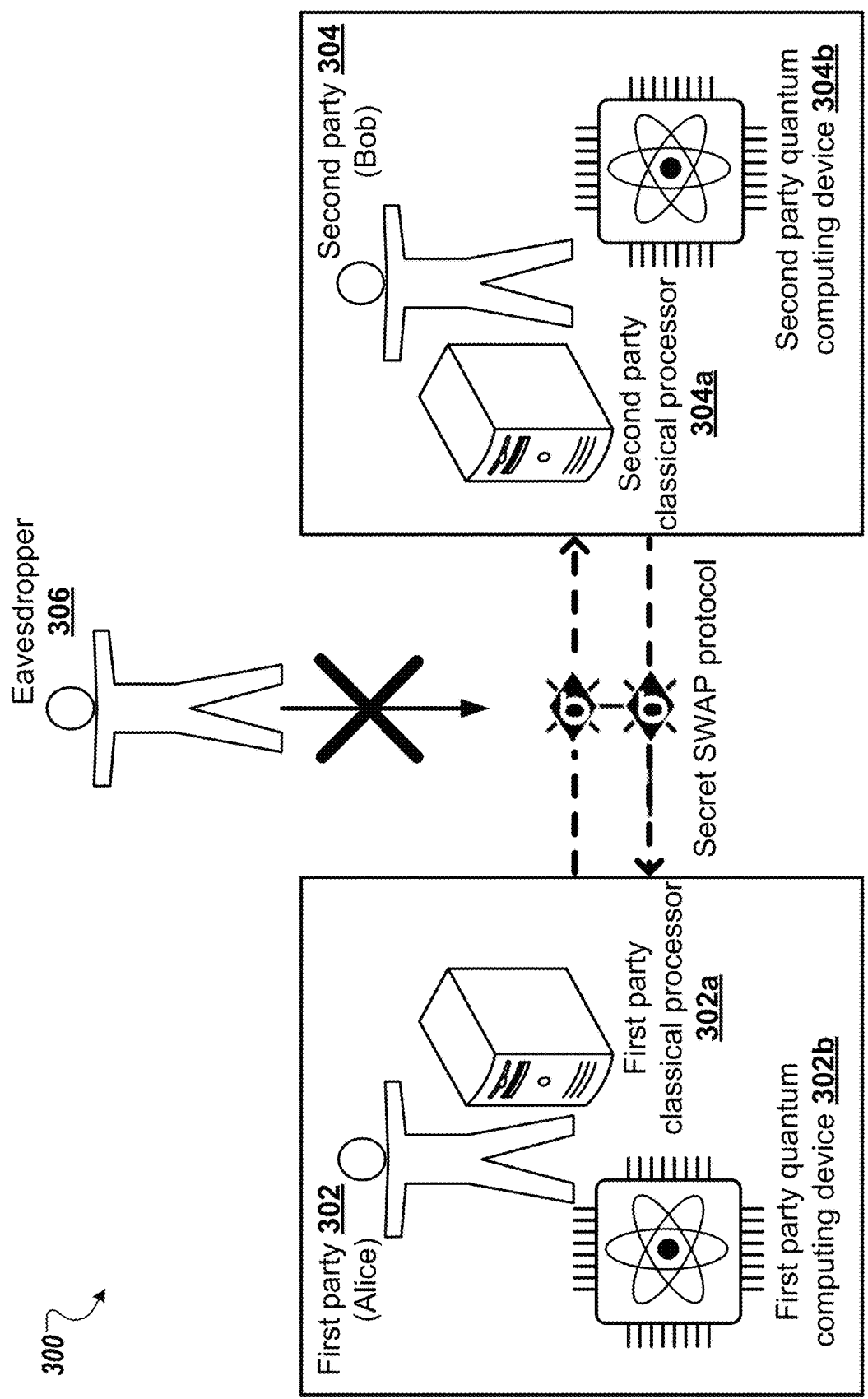
FIG. 3 shows a conceptual block diagram of an example system for implementing a secure quantum SWAP.

FIG. 3 shows a conceptual block diagram of an example system 300 for implementing a secure quantum SWAP. The example system 300 includes a first party 302 and a second party 304. The first party 302 includes a first party classical processor 302a and a first party quantum computing device 302b. The first party classical processor 302a and first party quantum computing device 302b can exchange electronic communications over one or more networks, or can exchange communications in another way, such as over one or more wired or wireless connections.

The first party classical processor 302a is configured to perform classical computations. The first party quantum computing device 302b is configured to perform quantum computations. For convenience, the first party classical processor 302a and first party quantum computing device 302b are illustrated as separate entities. However, in some implementations the classical processor 302a can be included in the quantum computing device 302b. That is, the quantum computing device 302b can include components for performing classical computing operations. Generally, the classical computing components of the first party 302 can be implemented as one or more classical computers having physical hardware like that described with respect to FIG. 12 and the quantum computing components of the first party 302 can be implemented as quantum computing devices having physical hardware like that described with respect to FIG. 11.

The second party 304 includes a second party classical processor 304a and a second party quantum computing device 304b. The second party classical processor 304a and second party quantum computing device 304b can exchange electronic communications over one or more networks, or can exchange communications in another way, such as over one or more wired or wireless connections.

The second party classical processor 304a is configured to perform classical computations. The second party quantum computing device 304b is configured to perform quantum computations. For convenience, the second party classical processor 304a and second party quantum computing device 304b are illustrated as separate entities. However, in some implementations the classical processor 104a can be included in the quantum computing device 304b. That is, the quantum computing device 304b can include components for performing classical computing operations. Generally, the classical computing components of the second party 304 can be implemented as one or more classical computers having physical hardware like that described with respect to FIG. 12 and the quantum computing components of the second party 304 can be implemented as quantum computing devices having physical hardware like that described with respect to FIG. 11.

The first party 302 and second party 304 use a secure SWAP protocol to exchange quantum information. The first party 302 is configured to perform quantum operations on a first qubit, including applying quantum gates to realize the SWAP as well as one or more secret quantum gate ciphers. In some implementations the first party can also determine and apply a pre-fix or post-fix commutator operation to ensure a successful swap of quantum information. Example operations performed by the first party 102 are described below with reference to FIGS. 2 to 10. Similarly, the second party 304 is configured to perform quantum operations on a second qubit, including applying corresponding quantum gates to realize the SWAP as well as one or more secret quantum gate ciphers. In some implementations the second party can also determine and apply a pre-fix or post-fix commutator operation to ensure a successful swap of quantum information. Example operations performed by the second party 304 are described below with reference to FIGS. 2 to 10.

Figure 4:
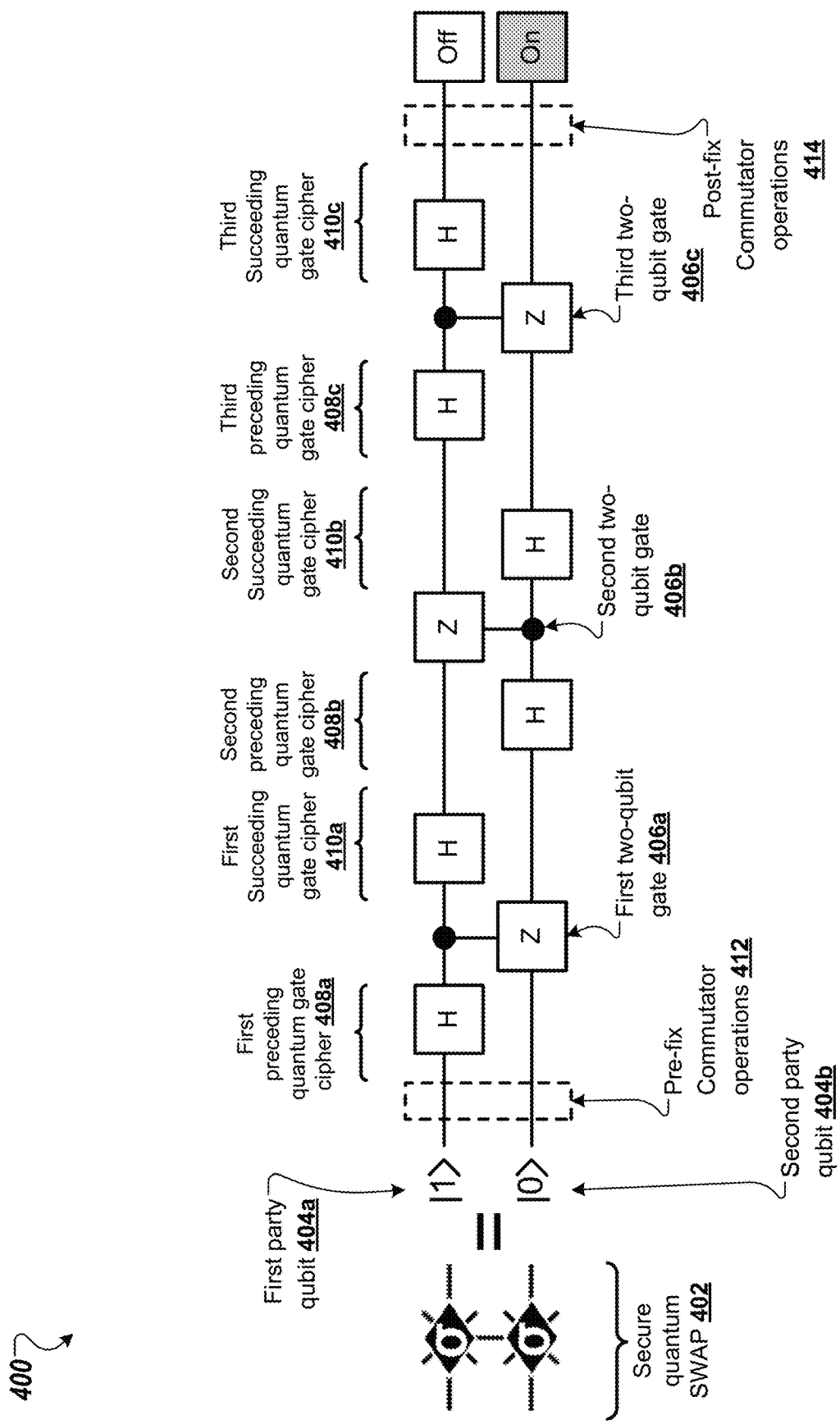
FIG. 4 shows an example quantum circuit diagram for implementing a secure quantum SWAP.

FIG. 4 shows an example quantum circuit diagram 400 for implementing a secure quantum SWAP gate 402 between a first party qubit 404a and a second party qubit 404b. Although not shown in FIG. 4, prior to executing the quantum circuit shown the first party and the second party agree to perform a specific quantum swap operation. For example, in the example quantum circuit shown in FIG. 4 the first party and second party have agreed to perform a controlled-Z gate decomposition of a quantum swap operation, as described above with reference to FIG. 1. In addition, prior to executing the quantum circuit, the first party and second party agree to use a secure swap protocol to perform the quantum swap operation. As described in more detail below with reference to FIGS. 6-8, in response to agreeing to use a secure swap protocol the first party and second party each select one or more quantum gate ciphers (and optionally one or more commutation operations) to incorporate into the controlled-Z gate decomposition. In some implementations the first party and second party do not communicate the selected quantum gate ciphers to each other, that is the quantum gate ciphers selected by the first party and second party can be secret quantum gate ciphers.

In the example shown in FIG. 4, a first party prepares a qubit 404a in a one state and a second party prepares a qubit 404b in a zero state. The first party and/or the second party then perform a respective first preceding quantum gate cipher 408a on their respective qubit. The preceding quantum gate cipher 408a can include any single qubit gates required to implement the agreed quantum SWAP operation, e.g., Hadamard gates, as well as other single qubit gates chosen in secret. For clarity, FIG. 4 shows relative positions of the preceding quantum gate cipher 408a (and other preceding/succeeding quantum gate ciphers) in the quantum circuit and does not show example quantum gates included in the preceding quantum gate cipher 408a (and other preceding/succeeding quantum gate ciphers). Example quantum gate ciphers and properties thereof are described in more detail below with reference to FIGS. 6 and 7.

The first party and second party then synchronize to perform the two-qubit gate 406a included in the agreed quantum swap operation.

The first party and/or the second party then perform a respective first succeeding quantum gate cipher 410a on their respective qubit. The succeeding quantum gate cipher 410a can include any single qubit gates required to implement the agreed quantum SWAP operation, e.g., Hadamard gates, as well as other single qubit gates chosen in secret.

The first party and second party repeat the above described operations 408a, 406a, 410a for subsequent two-qubit gates included in the quantum circuit. That is, the first party and/or the second party perform a respective second preceding quantum gate cipher 408b on their respective qubit, synchronize to perform the two-qubit gate 406b included in the agreed quantum swap operation, perform a respective second succeeding quantum gate cipher 410b on their respective qubit, perform a respective third preceding quantum gate cipher 408c on their respective qubit, synchronize to perform the two-qubit gate 406c included in the agreed quantum swap operation, and perform a respective third succeeding quantum gate cipher 410c on their respective qubit. In some implementations, adjacent quantum gate ciphers can be combined into one quantum gate cipher stage, e.g., the first succeeding quantum gate cipher 410a and second preceding quantum gate cipher 408b can be considered as one quantum gate cipher.

As described in more detail below with reference to FIGS. 6 and 8, in some implementations the first party and/or the second party can apply a pre-fix commutation operation 412 and/or a post-fix commutation operation 414 to their respective qubits prior to executing the first preceding quantum gate cipher 408a or after executing the third (last) succeeding quantum gate cipher 410c. Whether to apply a pre- or post-fix commutation operation to a respective qubit and the type of commutation operation to perform is dependent on the specific quantum gate ciphers 408a-c, 410a-c chosen in secret by the first and second party, as described in more detail below with reference to FIGS. 6 and 8.

In some implementations the first party and/or second party can measure their qubits, e.g., in the Z basis, to obtain the information that was initially encoded in the other party's qubit. For example, if the first party and second party were to measure their qubits after application of the third succeeding quantum gate cipher 410c (or optionally after a post-fix commutator operation) the first party would determine that their qubit is now in a zero state and the second party would determine that their qubit is now in a one state. In other implementations the first party and/or second party can use their qubits to perform additional operations, e.g., as part of a quantum algorithm or computation as described below with reference to FIGS. 10A and 10B.

Figure 5:
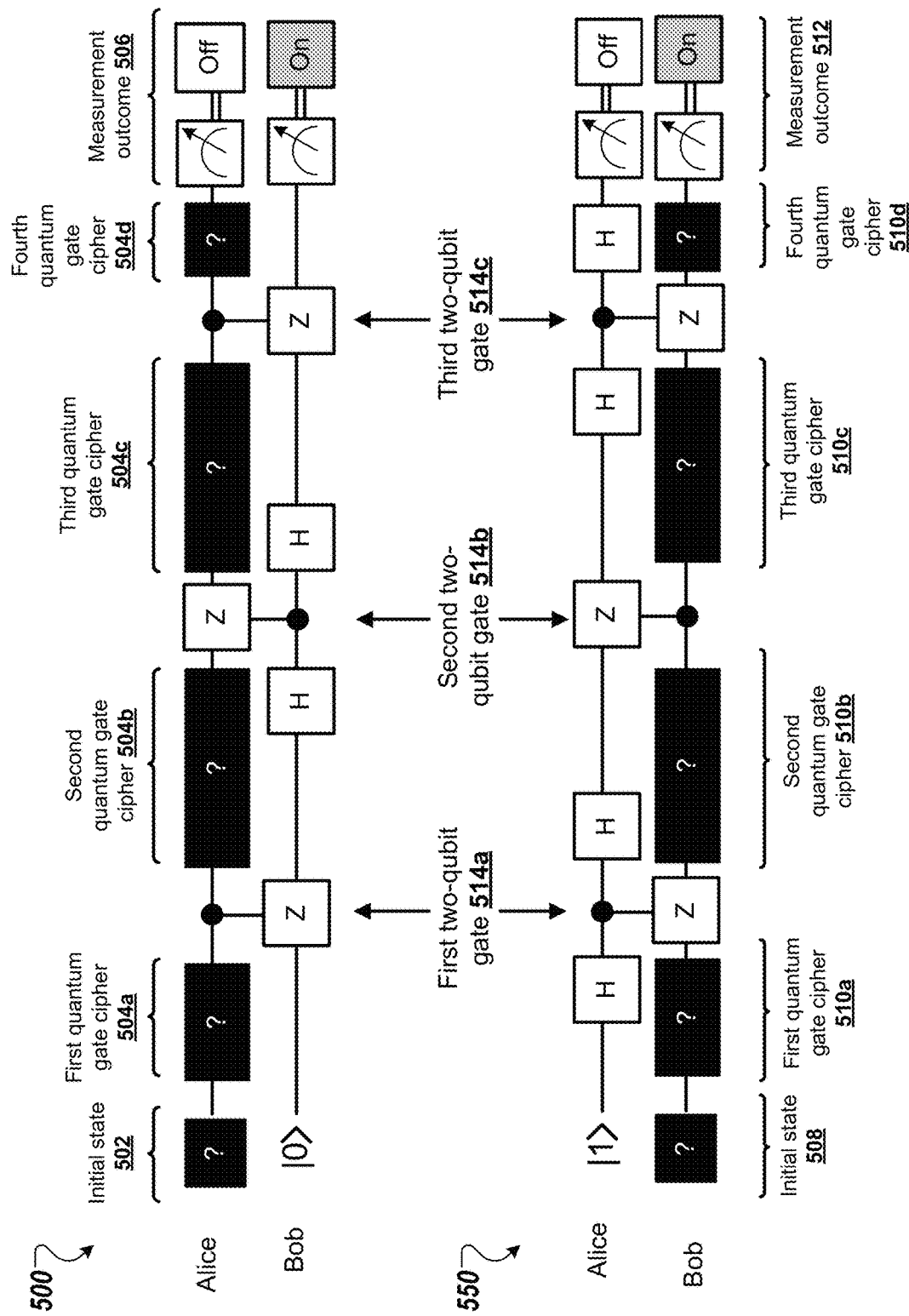
FIG. 5 shows example quantum circuit diagrams for implementing a secure quantum SWAP from the respective perspectives of a first party and a second party.

FIG. 5 shows a first example quantum circuit diagram 500 for implementing a secure quantum SWAP from the perspective of a second party (Bob) and a second quantum circuit diagram 550 for implementing a secure quantum SWAP from the perspective of a first party (Alice). As described above, prior to executing the quantum circuits 500 (or equivalently quantum circuit 550), Alice and Bob agree to perform a specific quantum swap operation and agree to use a secure swap protocol to perform the quantum swap operation. The secure swap protocol used by Alice and Bob can be a secret protocol. That is, Alice and Bob do not need to communicate which secure swap protocol (and therefore which quantum gate ciphers) they intend to use.

For example, as shown in example quantum circuit 500, after agreeing to perform a swap operation 114 of FIG. 1, Bob does not know which initial state 502 Alice prepares her qubit in. Neither does Bob know what quantum gates are included in the quantum gate ciphers 504a-d that Alice performs. Bob only synchronizes with Alice to perform the two-qubit gates 514a-c. Similarly, as shown in example quantum circuit 550, after agreeing to perform a swap operation 114 of FIG. 1, Alice does not know which initial state 508 Bob prepares his qubit in. Neither does Alice know what quantum gates are included in the quantum gate ciphers 510a-d that Bob performs. Alice only synchronizes with Bob to perform the two-qubit gates 514a-c.

Absent unintentional errors or malicious tampering, the measurement outcomes 506 and 512 obtained by Alice and Bob reflect that the state of Alice and Bob's qubits were swapped.

Figure 6:
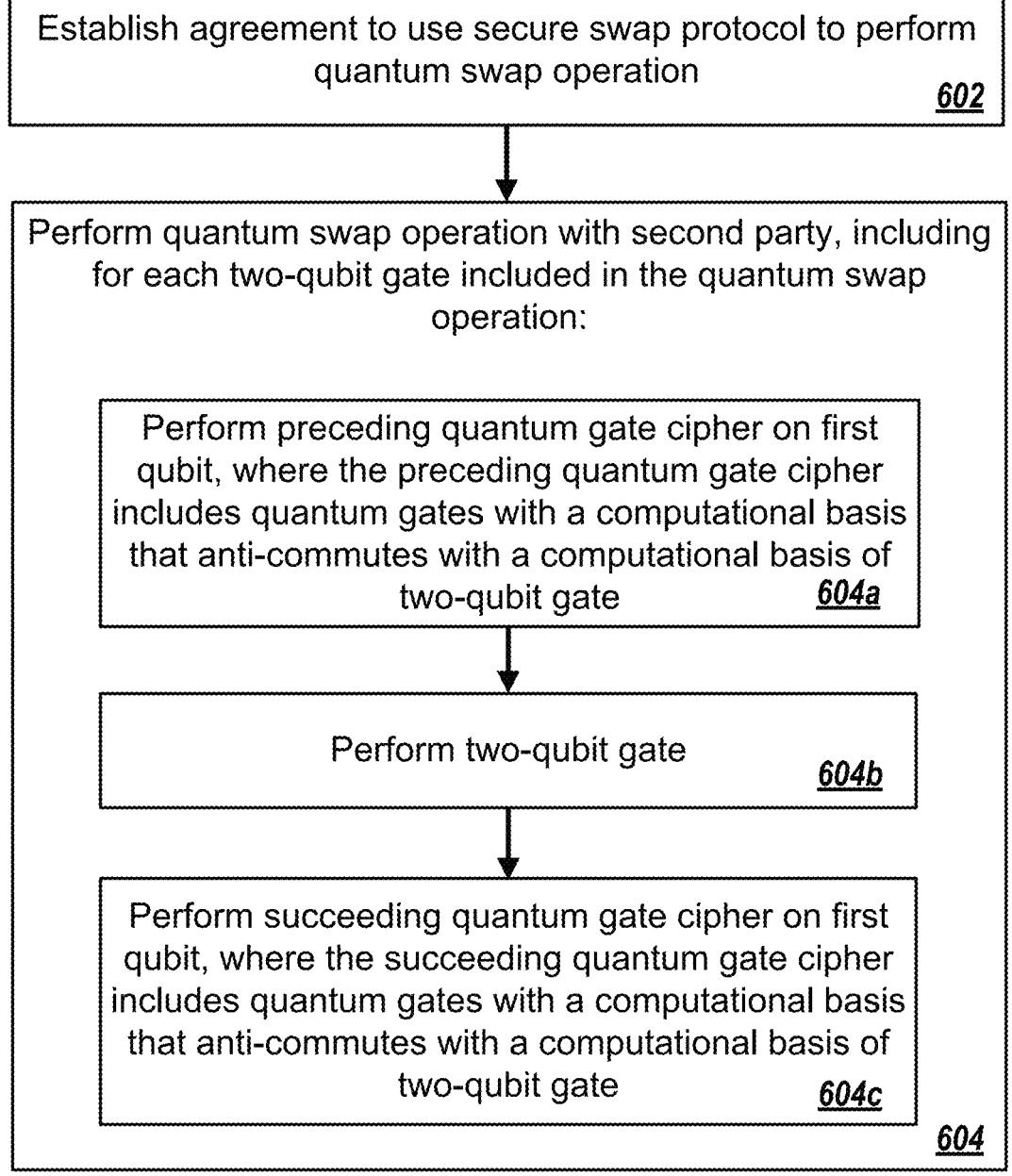
FIG. 6 is a flowchart of an example process for implementing a quantum swap operation on a first qubit.

FIG. 6 is a flowchart of an example process 600 for implementing a quantum swap operation on a first qubit and a second qubit. The first qubit can be in one location and controlled by a first party. The second qubit can be in another location and controlled by a second party. For convenience, the process 600 will be described from the perspective of the first party and be described as being performed by a system that includes one or more classical and quantum computing devices located in one or more locations. For example, the first party 302 of FIG. 3, appropriately programmed in accordance with this specification, can perform the process 600. However, the process 600 could also be performed by a second party, e.g., the second party 304 of FIG. 3.

The system establishes an agreement to use a secure swap protocol to perform the quantum swap operation with the second party (602). For example, the system can transmit and/or receive data indicating that the first party and second party are to implement a secure swap protocol to perform the quantum swap operation. The system can receive or transmit the data using a private secure channel, e.g., through an out-of-band (OOB) transmission. The data can include data specifying the type of quantum swap operation that is to be performed, e.g., data specifying that either a SWAP gate or other permutation of the SWAP gate is to be performed. The data can also include a decomposition of quantum gates to be used to achieve the quantum swap operation, e.g., data specifying that the decomposition 112 or 114 of FIG. 1 is to be used.

After the agreement is established, the system selects one or more secret quantum gate ciphers. The number of selected quantum gate ciphers can depend on the number of two-qubit gates included in the swap operation that is to be performed. For example, the number of quantum gate ciphers can be less than or equal to twice the number of two-qubit gates included in the swap operation. In some implementations the system can further determine a pre- or post-fix commutation correction operation to include in the quantum swap operation. Properties of the selected secret quantum gate ciphers and determined commutation correction operations are described in more detail below.

The system performs the quantum swap operation with the second party (step 604). To perform the quantum swap operation, the system identifies each two qubit gate included in the quantum swap operation. For each identified two-qubit gate included in the quantum swap operation, the system performs a preceding quantum gate cipher on the first qubit (step 604*a*). The system then synchronizes with the second party and performs, with the second party, the two-qubit gate on the first qubit and the second qubit (step 604*b*). For example, the system can use the first qubit as a control for a X or Z gate performed on the second qubit. The system then performs a respective succeeding quantum gate cipher on the first qubit (step 604*c*).

The preceding quantum gate cipher performed by the system at step 604*a* can include a sequence of quantum gates with an underlying computational basis that anti-commutes with the underlying computational basis of the two-qubit gate performed at step 604*b*. Two quantum gates anti-commute if their matrix representations A, B satisfy the relation {A, B}=AB+BA=0. In other words, if AB=−BA. For example, the preceding quantum gate cipher performed by the system at step 604*a* could be a Pauli X gate (or some power of a Pauli-X gate, e.g., $X^{1/2}$) and the two-qubit gate performed at step 604*b* could be a controlled Z gate. In this example the underlying computational basis of the preceding quantum gate cipher is a Pauli-X gate and the underlying computational basis of the two-qubit gate is a Pauli-Z gate. These gates anti-commute, as shown below:

$$XZ = \begin{pmatrix} 0 & 1 \\ 1 & 0 \end{pmatrix}\begin{pmatrix} 1 & 0 \\ 0 & -1 \end{pmatrix} = \begin{pmatrix} 0 & -1 \\ 1 & 0 \end{pmatrix}$$

-continued
$$-ZX = -\begin{pmatrix} 1 & 0 \\ 0 & -1 \end{pmatrix}\begin{pmatrix} 0 & 1 \\ 1 & 0 \end{pmatrix} = -\begin{pmatrix} 0 & 1 \\ -1 & 0 \end{pmatrix} = \begin{pmatrix} 0 & -1 \\ 1 & 0 \end{pmatrix}$$
$$\Rightarrow XZ = -ZX$$

Similarly, the succeeding quantum gate cipher performed by the system at step 604*c* can include a sequence of quantum gates with an underlying computational basis that anti-commutes with the underlying computational basis of the two-qubit gate performed at step 604*b*. Example preceding quantum gate ciphers and succeeding quantum gate ciphers are described below with reference to FIG. 8.

In some implementations both the preceding quantum gate cipher and the succeeding quantum gate cipher can each include two quantum gates—a first quantum gate that implements a 120 degree rotation across 3 axes and a second quantum gate that implements a 180 degree rotation—as described below with reference to FIG. 8.

In implementations where the quantum gate ciphers performed by the first party do not satisfy one or more of the above described anti-commutation conditions, the first qubit will erroneously rotate and at the end of the quantum swap operation will not have correctly swapped with the second qubit. In these implementations the system can perform a commutation correction quantum operation to the first qubit to correct the erroneous rotations of the first qubit and secure the swap operation. In some implementations the system can perform the commutation correction quantum operation after step 602, e.g., after the first party agrees to implement a secure swap protocol and chooses appropriate quantum gate ciphers. In other implementations the system can perform the commutation correction quantum operation after step 604, e.g., after the first party has implemented each of the quantum gate ciphers. Example commutation correction quantum operations are described below with reference to FIGS. 9A and 9B.

The preceding quantum gate ciphers and the succeeding quantum gate ciphers performed at step 604*a* and 604*c* can vary for each two-qubit gate included in the quantum swap operation. For example, the system can use a same preceding/succeeding quantum cipher for each two-qubit gate or different preceding/succeeding quantum gate cipher for each two-qubit gate. In some implementations the preceding/succeeding quantum gate ciphers can include one or more null ciphers, e.g., include only an identity operator. Incorporating one or more null ciphers can reduce the resource requirements, e.g., number of quantum gates, to be performed whilst maintaining secrecy.

Once the quantum swap operation has been performed, the system can measure the qubit to obtain information that was previously stored by the second party qubit, or perform additional quantum operations using the qubit.

For convenience, example process 600 describes operations performed by the first party system during the quantum swap operation. Operations performed by the second party system are similar to those performed by the first party system—the second party system establishes the agreement to use a secure swap protocol to perform the quantum swap operation with the first party, as described at step 602. The second party system selects one or more quantum gate ciphers (which are highly likely to be different to the quantum gate ciphers used by the first party system since the quantum gate ciphers are secret) and uses the secret quantum gate ciphers to perform the quantum swap operation with the first party, as described at step 604.

Example process 600 can also be applied to settings where the first party system and second party system are remotely located from each other, e.g., in locations that do not permit a direct swap, and/or in settings where the first party system and second party system do not want to perform a direct swap with each other. In these settings two implementations of the secure swap protocol can be interleaved using a third party system (Charlie).

Figure 7:
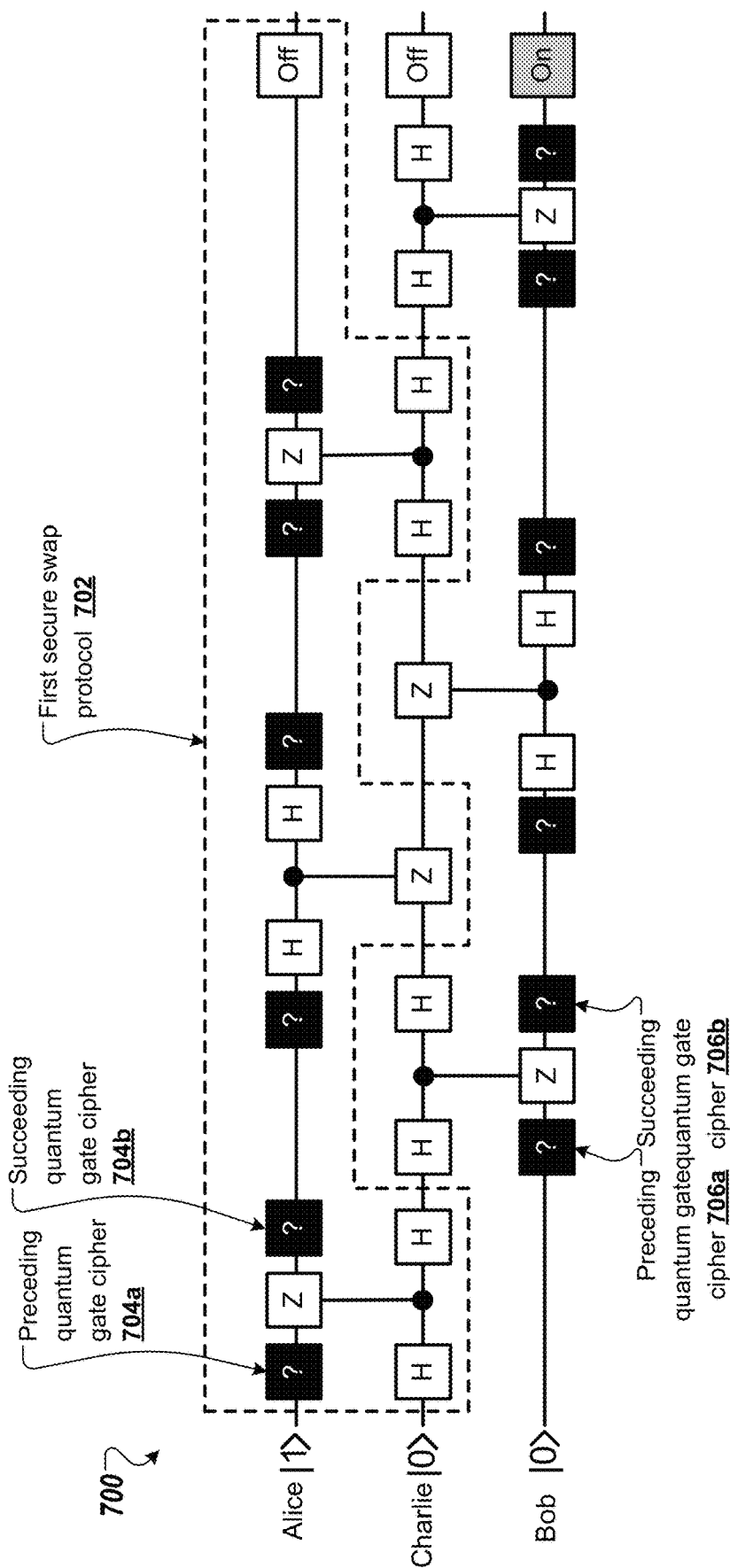
FIG. 7 shows an example quantum circuit for performing a three-party secure SWAP operation.

FIG. 7 shows an example quantum circuit 700 for performing a three-party secure SWAP operation. A first party, Alice, prepares a first qubit in a one state and a second party, Bob, prepares a second qubit in a zero state. A third party system, Charlie, prepares a third qubit in a zero state. Alice and Charlie perform a first implementation 702 of the secure swap protocol described above. That is, Alice performs one or more quantum gate ciphers on her qubit, e.g., preceding quantum gate cipher 704a and succeeding quantum gate cipher 704b. Bob and Charlie perform a second implementation of the secure swap protocol. That is, Bob performs one or more quantum gate ciphers on his qubit, e.g., preceding quantum gate cipher 706a and succeeding quantum gate cipher 706b. By construction, the secure swap protocol prevents Charlie from having access to the state of Alice's qubit and the state of Bob's qubit at any time during the SWAP operation, since Charlie never sees or has possession of the state of Alice's qubit or Bob's qubit. Instead, Charlie sees or obtains a quantum state that has been encrypted using a quantum gate cipher.

Figure 8:
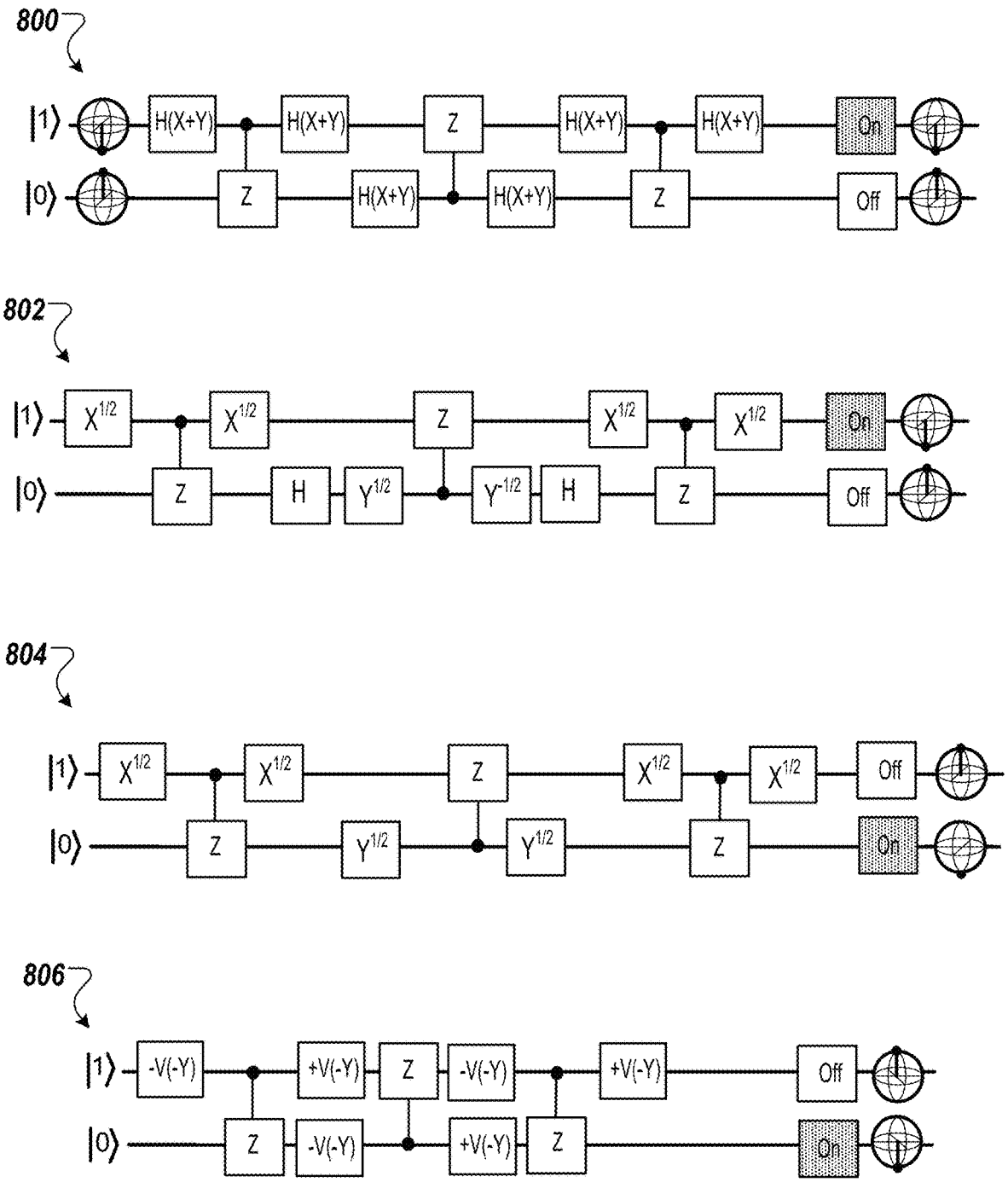
FIG. 8 shows quantum circuits with example quantum gate ciphers.

FIG. 8 shows various quantum circuits with example quantum gate ciphers. In quantum circuit 800, the first party prepares a qubit in a one state. The second party prepares a qubit in a zero state. Both the first party and the second party use the quantum logic gate H(X+Y)=

$$XS = \begin{pmatrix} 0 & 1 \\ i & 0 \end{pmatrix}$$

as a preceding quantum gate cipher and a succeeding quantum gate cipher. The two-qubit gates included in the swap operation are controlled Z gates. In this example, the quantum circuit 800 does not achieve a swap operation—after application of the quantum circuit 800 the first party qubit is still in a one state and the first party qubit is still in a zero state. This is because the gate H(X+Y) acts on the underlying computational basis (controlled-Z basis) states |0> and |1> in a non-perpendicular manner. That is, H(X+Y) converts a |0> to i|1> and a |1> to |0> on the Z axis. The Z-axis is not perpendicular to the Z-axis basis, therefore the underlying computational basis of the cipher H(X+Y) does not anti-commute with the underlying computational basis of the two-qubit gate (controlled-Z). The perpendicularity of the underlying computational basis of the cipher and the computational basis of the two-qubit gate (Z-controlled Pauli-Z) used in the swap is necessary to swap information across the two qubit. For example, if the cipher was a H(X+Z) gate the underlying computational basis of the cipher would anti-commute with the underlying computational basis of the two-qubit gate (controlled-Z). The gate H(X+Z) acts on the computational basis (Z-controlled Pauli-Z basis) states |0> and |1> in a perpendicular manner. Meaning H(X+Z) converts a |0> to |+> and |1> to |−> on the X axis. The X-axis is perpendicular to the Z-axis basis, therefore the underlying computational basis of the cipher H(X+Z) anti-commutes with the underlying computational basis of the two-qubit gate (controlled-Z).

The gate H(X+Y) could be used as a cipher if the two qubit gates were replaced, e.g., with controlled Y gates. If this example the circuit would work as intended and correctly SWAP the qubits because the rotation(s) being used are perpendicular to the computational basis of the two-qubit gate.

In quantum circuit 802, the first party prepares a qubit in a one state. The second party prepares a qubit in a zero state. The first party uses $X^{1/2}$ as a preceding quantum gate cipher and a succeeding quantum gate cipher. The second party uses $HY^{1/2}$ as a preceding quantum gate cipher and $Y^{1/2}H$ as a succeeding quantum gate cipher. The two-qubit gate is a controlled Z gate. In this example, the quantum circuit 802 does not achieve a swap operation—after application of the quantum circuit 802 the first party qubit is still in a one state and the first party qubit is still in a zero state. This is because the gate $X^{1/2}$ acts on the underlying computational basis (controlled-Z basis) states |0> and |1> in a perpendicular manner. That is, $X^{1/2}$ converts a |0> to |i> and a |1> to |−i>. However, the gate $HY^{1/2}$ acts on the underlying computational basis states in a non-perpendicular manner. That is, $HY^{1/2}$ converts |0> to |1> and a |1> to |0>. In quantum circuit 804, the first party prepares a qubit in a one state. The second party prepares a qubit in a zero state. The first party uses $X^{1/2}$ as a preceding quantum gate cipher and a succeeding quantum gate cipher. The second party uses $Y^{1/2}$ as a preceding quantum gate cipher and as a succeeding quantum gate cipher. The two-qubit gate is a controlled Z gate. In this example, the quantum circuit 804 does achieve a swap operation—after application of the quantum circuit 804 the first party qubit is in a zero state and the first party qubit is in a one state. This is because the underlying computational bases of $X^{1/2}$ and $Y^{1/2}$ (i.e., X and Y) each anti-commute with the underlying basis of the controlled-Z operation (i.e., Z). In addition, the sequence $X^{1/2}ZX^{1/2}$ anti-commutes with $Y^{1/2}ZY^{1/2}$. In this example, the swapped information is phased during the swap. For example, although not shown in circuit 804, if the first party's qubit were in a |+> before the swap, then the second party would receive a |i> (and if the second party qubit were in a |+> before the swap, then the first party would receive a |−i>). Therefore, to achieve a correct swap the first party and second party need priori knowledge before the swap to correct the phasing or communicate to each other after the swap to correct it, as described below with reference to FIG. 9.

In quantum circuit 806, the first party prepares a qubit in a one state. The second party prepares a qubit in a zero state. The first party uses −V(−Y) as a preceding quantum gate cipher and +V(−Y) as succeeding quantum gate cipher. The second party uses the same ciphers. The two-qubit gate is a controlled Z gate. In this example, the quantum circuit 806 does achieve a swap operation—after application of the quantum circuit 806 the first party qubit is in a zero state and the first party qubit is in a one state. This is because −V(−Y) acts on the computational basis states in a perpendicular manner. That is, −V(−Y) converts |0> to |+> and |1> to |−>. Similarly, +V{−Y} acts on the computational basis states in a perpendicular manner. That is, +V{−Y} converts |0> to |−i> and |1> to |i>. Therefore, the underlying computational bases of the ciphers used by the first party and second party anti-commute with the underlying basis of the controlled Z operation.

In quantum circuit 806, the succeeding quantum gate cipher used by the first party or second party is an inverse of the respective preceding quantum gate cipher. This enables the qubits to cleanly rotate and anti-commute without errors during swap. If the succeeding quantum gate cipher was not an inverse of the preceding quantum gate cipher, correction operations applied before, during, and/or after the swap protocol could be required to ensure incorrect rotations are performed and the qubit still anti-commutes during the swap protocol.

In some implementations a V gate, e.g., a gate that implements a 120 degree rotation across 3 axis as given below with reference to FIG. 11, can be used as a quantum gate cipher to increase the likelihood that the quantum gate cipher does not accidentally commute cleanly with other Clifford gates (which tend to perform 180 or 90 degree rotations across 1 or 2 axis). Accordingly, the possibility of an adversary guessing an incorrect cipher that still swaps due to Pauli X Y and Z all being anti-commutators to each other is reduced.

Figure 9A:
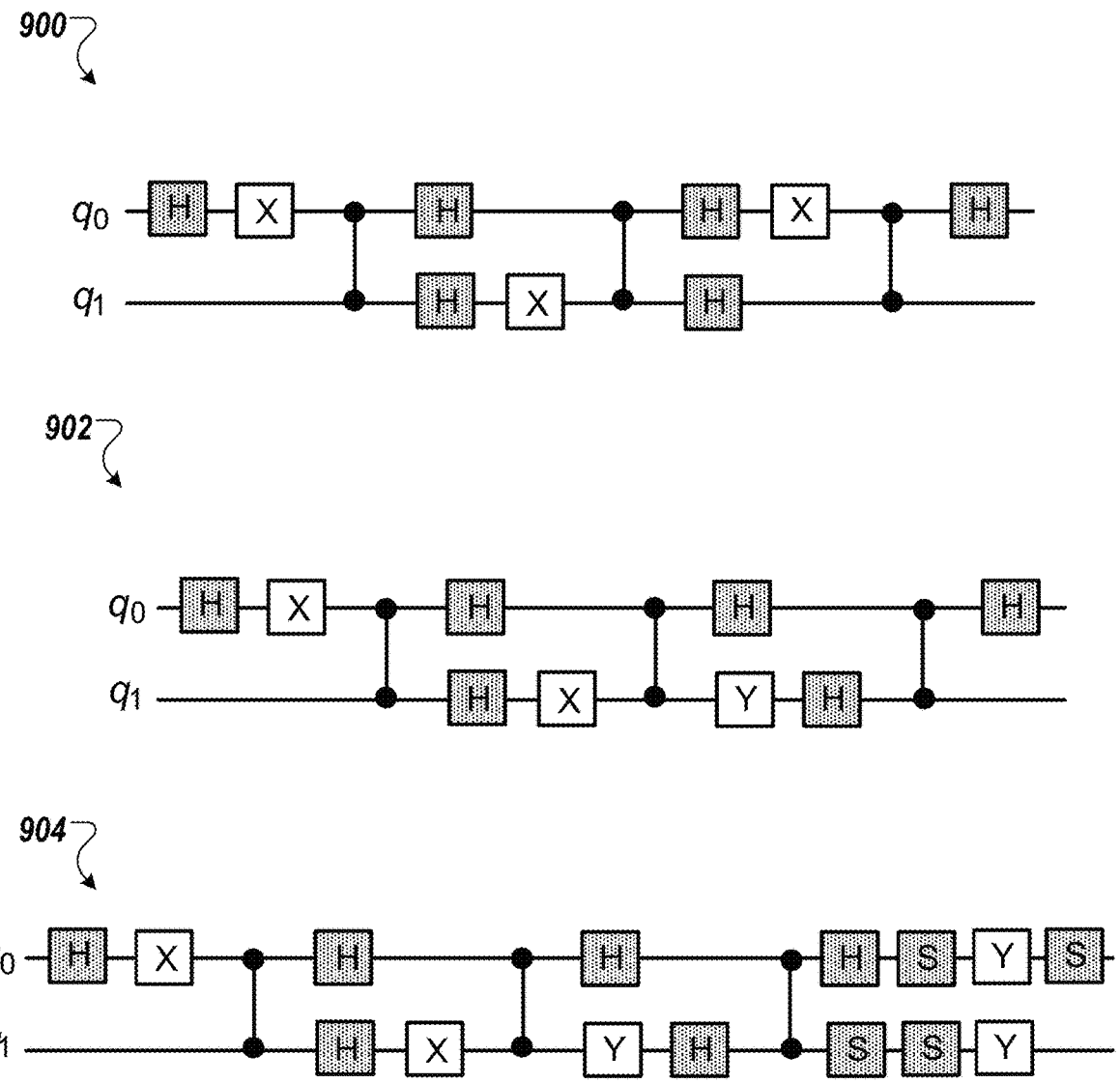
FIG. 9A shows quantum circuits and example commutation correction quantum operations.

FIG. 9A shows quantum circuits and example commutation correction quantum operations. Quantum circuit 900 shows quantum gates that achieve a correct and clean swap of the states of the qubits $q_0$ and $q_1$. In this example, the first party uses HX as a preceding quantum gate cipher and H as a succeeding quantum gate cipher. The second party also uses HX as a preceding quantum gate cipher and H as a succeeding quantum gate cipher. The two-qubit gate is a controlled Z gate. In this example, the quantum circuit 900 achieves a correct swap operation because the underlying computational basis of HX anti-commutes with the underlying computational basis of the controlled Z gate (i.e. Z). A matrix representation of the swap operation is given by $$\begin{pmatrix} 1 & 0 & 0 & 0 \\ 0 & 0 & 1 & 0 \\ 0 & 1 & 0 & 0 \\ 0 & 0 & 0 & 1 \end{pmatrix}.$$

In quantum circuit 902 errors have been introduced into quantum circuit 900. The second party inserts a Y rotation in the succeeding quantum gate cipher and the first party has omitted an X rotation in a preceding quantum gate cipher. This creates the following SWAP matrix permutation with mixed imaginary components:

$$\begin{pmatrix} 0 & 0 & 0 & i \\ 0 & -i & 0 & 0 \\ 0 & 0 & i & 0 \\ -i & 0 & 0 & 0 \end{pmatrix}.$$

Under quantum circuit 902, information is swapped but the swap needs to be corrected because all the components are not the same and the correct qubit information is not swapped. Quantum circuit 904 shows post-fix corrections that can be added to quantum circuit 902 to achieve a correct swap. In quantum circuit 904, the first party applies a post-fix correction SYS and the second party applies a post-fix correction SSY. These commutator corrections create the swap matrix $$\begin{pmatrix} 1 & 0 & 0 & 0 \\ 0 & 0 & 1 & 0 \\ 0 & 1 & 0 & 0 \\ 0 & 0 & 0 & 1 \end{pmatrix}.$$

which has all the same unitary elements and is a swap permutation that correctly SWAPs the original qubit information.

Figure 9B:
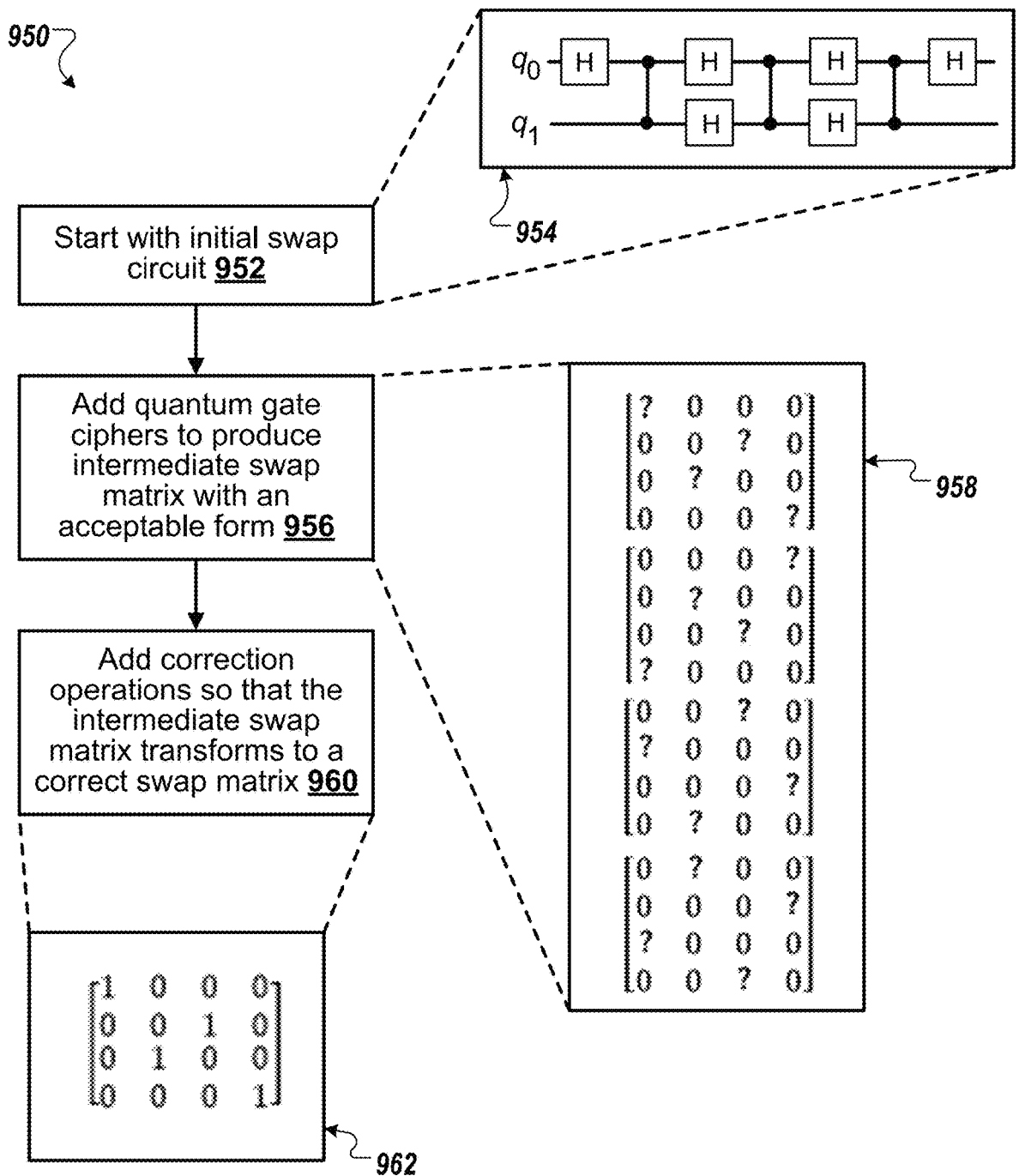
FIG. 9B is a flow diagram of an example process for creating secret quantum gate ciphers prior to implementing a secure swap operation.

FIG. 9B is a flow diagram of an example process 950 for creating secret quantum gate ciphers prior to implementing a secure swap operation. The process 950 is described from the perspective of either the first party or second party and is described as being performed by a system that includes one or more classical and quantum computing devices located in one or more locations. For example, the first party 302 or second party 304 of FIG. 3, appropriately programmed in accordance with this specification, can perform the process 950.

The system defines an initial swap circuit and corresponding initial swap matrix that represents the action of the initial swap circuit (step 952). An example initial swap circuit is shown in box 954. In the example initial swap circuit 954 the two-qubit gate is a controlled Z gate and each initial preceding and succeeding quantum gate cipher is a Hadamard gate.

The system adds quantum gates to the initial preceding and succeeding quantum gate ciphers to produce an intermediate swap matrix that has an acceptable form (step 956). The acceptable forms are shown in box 958. As shown, there are four acceptable forms. Entries of the matrices in box 958 labelled "?" can take any non-zero unitary value, e.g., 1, −1, i, −i, etc. In addition, the entries labelled "?" can include any combination of non-zero unitary values. There are 256 possible valid combinations of non-zero unitary values and a total of 1024 unique SWAP matrices. Intermediate swap matrices that have an acceptable form represent quantum circuits that can achieve a valid secure swap operation, but will require additional quantum gate rotations to correct the state of the qubits during the secure swap operation (since the qubits can experience rotations/phasing/flipping). Intermediate swap matrices that do not have an acceptable form represent quantum circuits that will not swap information and cannot be corrected by adding additional quantum gates to the circuit.

The system adds correction operations to the quantum circuit to transform the intermediate swap matrix to a correct swap matrix (step 960). A correct swap matrix is shown in box 962. The correct swap matrix represents a quantum circuit that swaps the states of two qubits without error.

The system can use the resulting quantum circuit (i.e., the resulting preceding and succeeding quantum gate ciphers) in a future secure swap operation. In some implementations example process 950 can be repeated to produce multiple different quantum circuits that achieve a correct swap operation. In some implementations the first and second party can determine when and how to apply each of these different quantum circuits in future computations. For example, the first and second party can agree to use specific quantum circuits when performing certain computations. As another example, the first and second party can agree than one party randomly select one of the quantum circuits and communicate the selected quantum circuit to the other party each time a swap operation is to be performed.

Figure 10A:
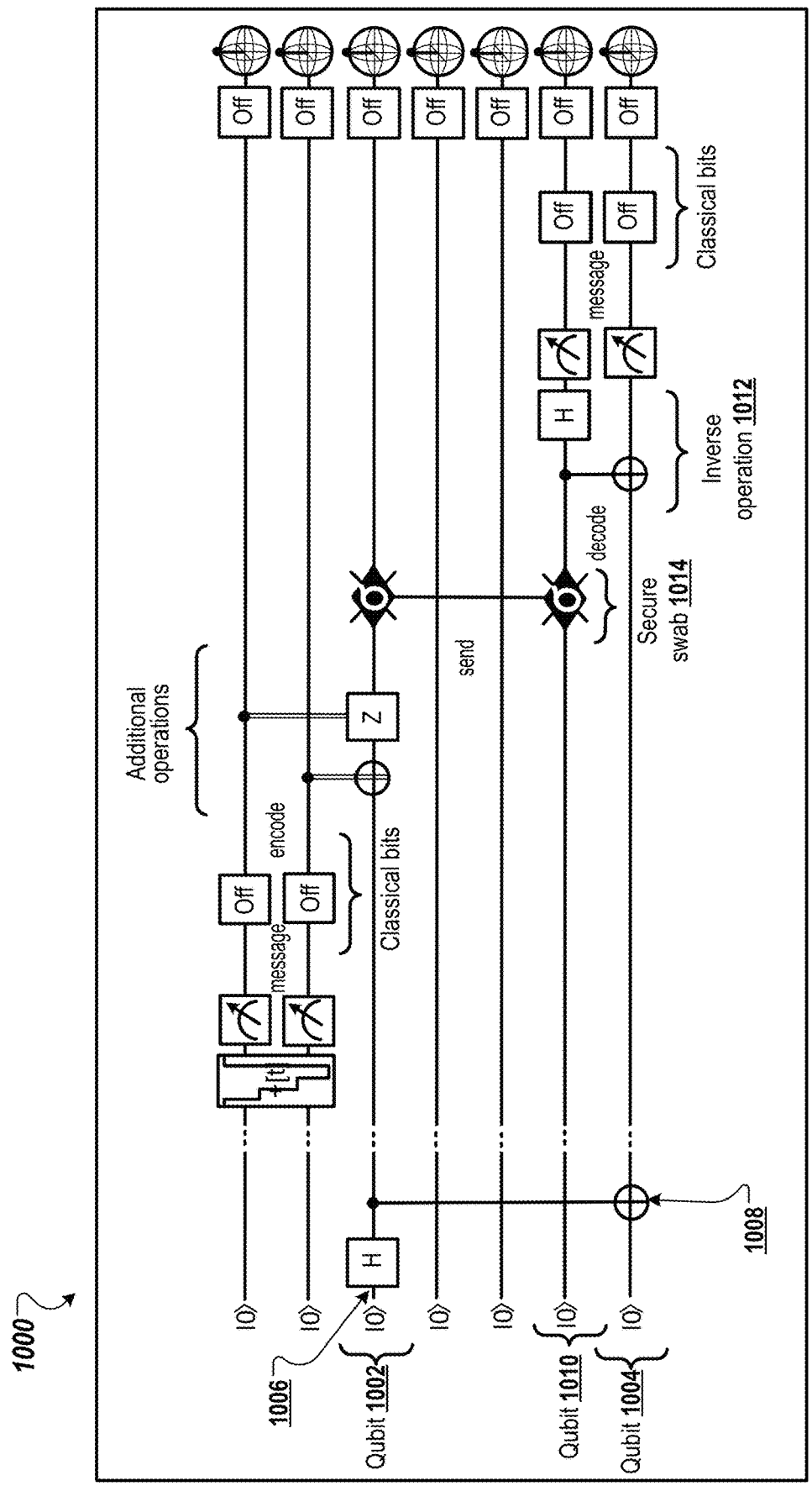
FIG. 10A shows an example circuit diagram for an implementation of enhanced superdense coding.

FIG. 10A shows an example circuit diagram 1000 for an implementation of enhanced superdense coding. Superdense coding is a procedure that allows a first party (Alice) to send two classical bits to a second party (Bob) using a single qubit of communication. The first party prepares two qubits in an entangled quantum state (a Bell state) using a Hadamard gate and a CNOT operation. The first party then performs additional quantum operations to qubit, where the additional operations are based on classical bits of information that the first party wants to share with the second party. The first party transmits the state of the qubit to the second party using a standard swap operation. The second party receives the state of the qubit and performs quantum operations to obtain the classical bits of information that the first party encoded in the qubit. The quantum operations include a restoration operation—the second party uses another qubit to apply an inverse of the quantum operations performed by the first party to create the entangled quantum state, i.e., a CNOT gate followed by a Hadamard gate. The second party then measures the qubits and to obtain the two classical bits of information.

In the example quantum circuit 1000, the first party and second party have agreed, in advance, to use a secret quantum swap protocol to perform the swap operation included in the superdense encoding implementation. Alice prepares two qubits 1002, 1004 in an entangled quantum state (a Bell state) using a Hadamard gate 1006 and a CNOT gate 1008. Alice then performs additional quantum operations to qubit 1002, where the additional operations are based on classical bits of information that the sender party wants to share with the recipient party.

In this example, Alice and Bob have agreed, in advance, to use a secure swap protocol in the superdense coding implementation. Therefore, Alice transmits the qubit 1002 to Bob using a secret quantum swap 1014.

Bob receives the qubit 1002 and performs quantum operations to obtain the classical bits of information that Alice encoded in the qubit 1002. The quantum operations include a restoration operation—Bob uses another qubit 1010 to apply an inverse 1012 of the quantum operations performed by Alice to create the entangled quantum state, i.e., a CNOT gate followed by a Hadamard gate. Bob then measures the qubits 1010 and 1004 to obtain the two classical bits of information.

Figure 10B:
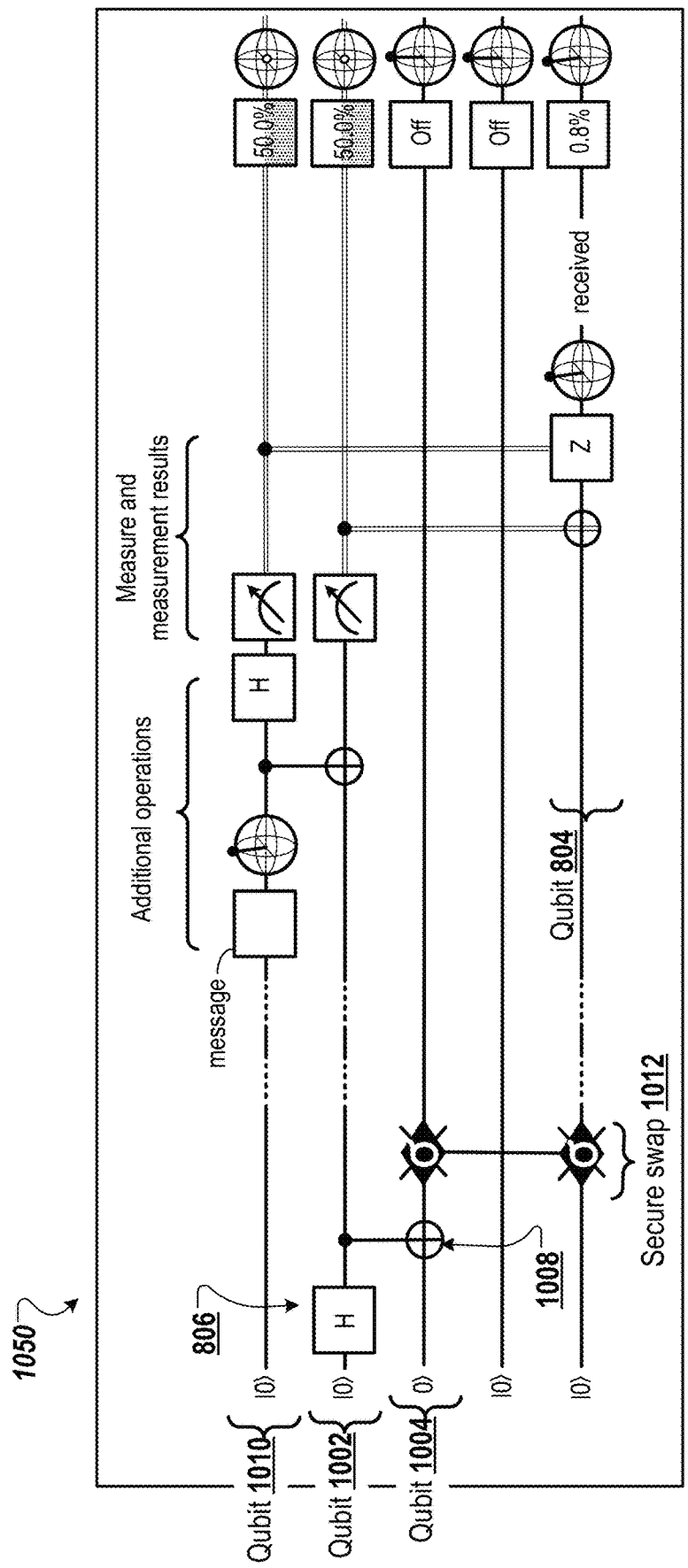
FIG. 10B shows an example circuit diagram for an implementation of enhanced quantum teleportation.

FIG. 10B shows an example circuit diagram 1050 for an implementation of enhanced quantum teleportation. Quantum teleportation is a process by which the state of a qubit can be transmitted from one location to another, using two bits of classical communication and a Bell pair. In other words, it is a protocol that destroys the quantum state of a qubit in one location and recreates it on a qubit at a distant location with the help of shared entanglement. In the example shown in FIG. 10B, Alice prepares two qubits 1002, 1004 in an entangled quantum state (a Bell state) using a Hadamard gate 1006 and a CNOT operation 1008. Alice then sends the qubit 1004 to Bob. In this example, Alice and Bob have agreed, in advance, to use a secure swap protocol in the teleportation implementation. Therefore, Alice transmits the qubit 1004 to Bob using a secret quantum swap 1012.

Alice also prepares qubit 1010 with information and entangles this information down into qubit 1002 using additional quantum operations. Alice measures qubits 1002 and 1010 and sends the classical measurement results to Bob.

Bob receives the classical information and returns it to the qubit 1004 he received from Alice through application of a CNOT gate, where one classical bit acts as a control for the CNOT operation, and a Pauli Z gate, where another classical bit acts as a control for the Pauli-Z gate. The information in qubit 1010 has then been teleported to Bob.

Figure 11:
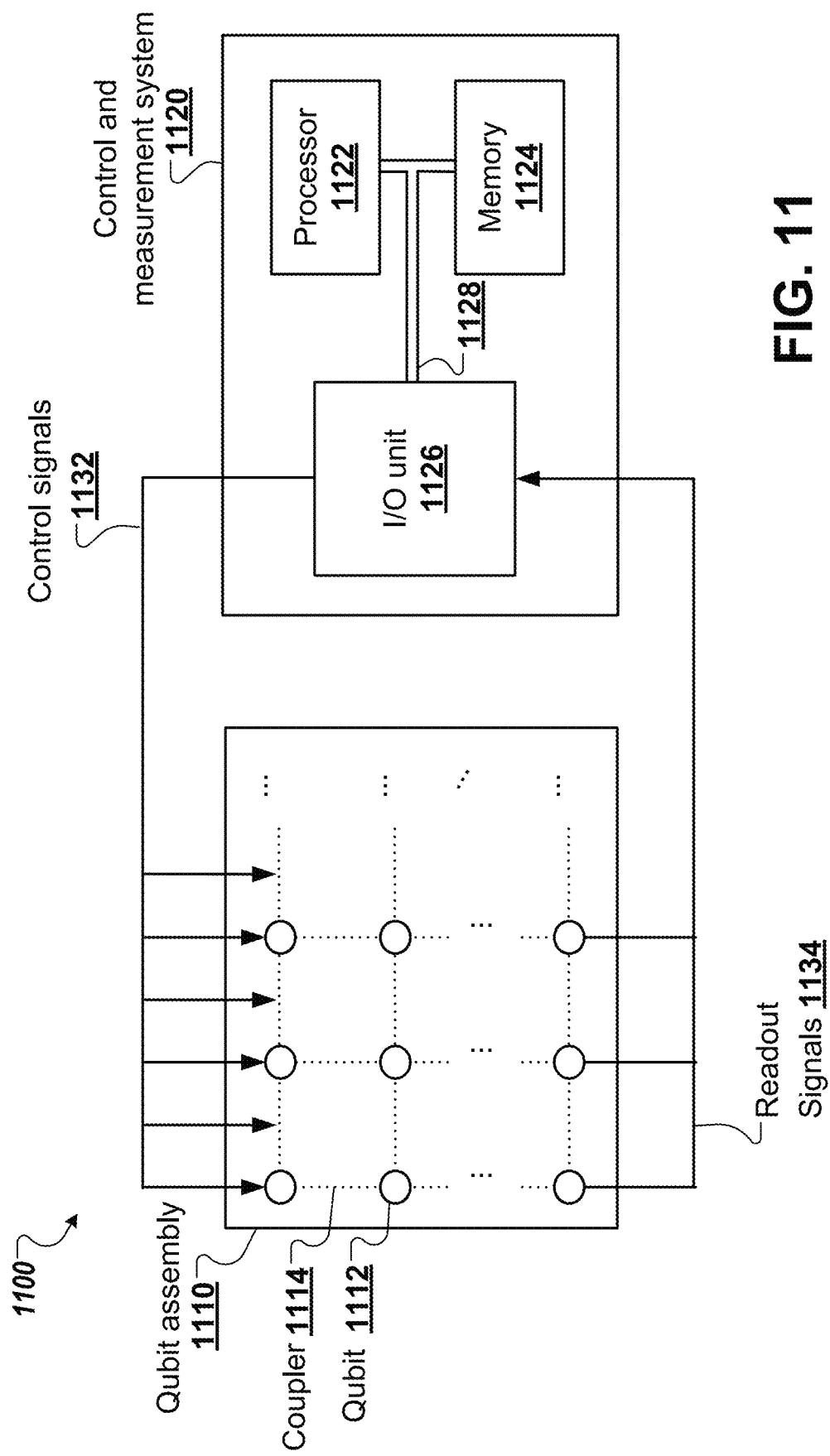
FIG. 11 shows an example an example quantum computing device that may be used to carry out the quantum computing methods described herein.

FIG. 11 is a block diagram of an example quantum computing device 1100. The quantum computing device 1100 can be used to perform the quantum computation operations described in this specification according to some implementations. The quantum computing device 1100 is intended to represent various forms of quantum computing devices. The components shown here, their connections and relationships, and their functions, are exemplary only, and do not limit implementations of the inventions described and/or claimed in this document.

The quantum computing device 1100 includes a qubit assembly 1110 and a control and measurement system 1120. The qubit assembly includes multiple qubits, e.g., qubit 1112, that are used to perform algorithmic operations or quantum computations. While the qubits shown in FIG. 11 are arranged in a rectangular array, this is a schematic depiction and is not intended to be limiting. The qubit assembly 1110 also includes adjustable coupling elements, e.g., coupler 1114, that allow for interactions between coupled qubits. In the schematic depiction of FIG. 11, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a two-level quantum system or device having levels representing logical values of 0 and 1. The specific physical realization of the multiple qubits and how they interact with one another is dependent on a variety of factors including the type of the quantum computing device 1100 or the type of quantum computations that the quantum computing device 1100 is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed by initializing the qubits in a selected initial state and applying a sequence of quantum logic gates to the qubits. Example quantum logic gates include single-qubit gates, e.g., Pauli-X, Pauli-Y, Pauli-Z (also referred to as X, Y, Z), variations of the Pauli gates, e.g., $\sqrt{X}$, $\sqrt{Z}$, $\sqrt{Y}$ gates, Hadamard H and S gates, two-qubit gates, e.g., controlled-X, controlled-Y, controlled-Z (also referred to as CX, CY, CZ), CNOT and gates involving three or more qubits, e.g., Toffoli gates. Other gates include alternative Hadamard gates and V gates, e.g., $$H(Y+Z) = \begin{pmatrix} 1/\sqrt{2} & -i/\sqrt{2} \\ i/\sqrt{2} & -1/\sqrt{2} \end{pmatrix}$$

$$H(Y-Z) = \begin{pmatrix} 1/\sqrt{2} & i/\sqrt{2} \\ -i/\sqrt{2} & -1/\sqrt{2} \end{pmatrix}$$

$$H(X-Z) = \begin{pmatrix} i/\sqrt{2} & -i/\sqrt{2} \\ -i/\sqrt{2} & -i/\sqrt{2} \end{pmatrix}$$

$$H(X-Y) = \begin{pmatrix} 0 & 1 \\ -i & 0 \end{pmatrix}$$

$$H(X+Y) = \begin{pmatrix} 0 & 1 \\ i & 0 \end{pmatrix}$$

$$-V(-Y) = \begin{pmatrix} 1/\sqrt{2} & i/\sqrt{2} \\ 1/\sqrt{2} & -i/\sqrt{2} \end{pmatrix}$$

$$+V(-Y) = \begin{pmatrix} 1/\sqrt{2} & 1/\sqrt{2} \\ -i/\sqrt{2} & i/\sqrt{2} \end{pmatrix}$$

-continued $$-V = \begin{pmatrix} 1/\sqrt{2} & 1/\sqrt{2} \\ i/\sqrt{2} & -i/\sqrt{2} \end{pmatrix}$$

$$+V = \begin{pmatrix} 1/\sqrt{2} & -i/\sqrt{2} \\ 1/\sqrt{2} & i/\sqrt{2} \end{pmatrix}$$

$$-V(-Z) = \begin{pmatrix} 1/\sqrt{2} & i/\sqrt{2} \\ -1/\sqrt{2} & i/\sqrt{2} \end{pmatrix}$$

$$+V(-Z) = \begin{pmatrix} 1/\sqrt{2} & -1/\sqrt{2} \\ -i/\sqrt{2} & -i/\sqrt{2} \end{pmatrix}$$

$$-V(-X) = \begin{pmatrix} i/\sqrt{2} & 1/\sqrt{2} \\ -i/\sqrt{2} & 1/\sqrt{2} \end{pmatrix}$$

$$+V(-X) = \begin{pmatrix} -i/\sqrt{2} & i/\sqrt{2} \\ 1/\sqrt{2} & 1/\sqrt{2} \end{pmatrix}$$

The quantum logic gates can be implemented by applying control signals 1132 generated by the control and measurement system 1120 to the qubits and to the couplers.

For example, in some implementations the qubits in the qubit assembly 1110 can be frequency tuneable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 1132 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as Z, using respective control signals 1134. The measurements cause readout signals 1134 representing measurement results to be communicated back to the measurement and control system 1120. The readout signals 1134 may include RF, microwave, or optical signals depending on the physical scheme for the quantum computing device 1100 and/or the qubits. For convenience, the control signals 1132 and readout signals 1134 shown in FIG. 11 are depicted as addressing only selected elements of the qubit assembly (i.e. the top and bottom rows), but during operation the control signals 1132 and readout signals 1134 can address each element in the qubit assembly 1110.

The control and measurement system 1120 is an example of a classical computer system that can be used to perform various operations on the qubit assembly 1110, as described above. The control and measurement system 1120 includes one or more classical processors, e.g., classical processor 1122, one or more memories, e.g., memory 1124, and one or more I/O units, e.g., I/O unit 1126, connected by one or more data buses, e.g., bus 1126. The control and measurement system 1120 can be programmed to send sequences of control signals 1132 to the qubit assembly, e.g. to carry out a selected series of quantum gate operations, and to receive sequences of readout signals 1134 from the qubit assembly, e.g. as part of performing measurement operations.

The processor 1122 is configured to process instructions for execution within the control and measurement system 1120. In some implementations, the processor 1122 is a single-threaded processor. In other implementations, the processor 1122 is a multi-threaded processor. The processor 1122 is capable of processing instructions stored in the memory 1124.

The memory 1124 stores information within the control and measurement system 1120. In some implementations, the memory 1124 includes a computer-readable medium, a volatile memory unit, and/or a non-volatile memory unit. In some cases, the memory 1124 can include storage devices capable of providing mass storage for the system 1120, e.g. a hard disk device, an optical disk device, a storage device that is shared over a network by multiple computing devices (e.g., a cloud storage device), and/or some other large capacity storage device.

The input/output device 1126 provides input/output operations for the control and measurement system 1120. The input/output device 1126 can include D/A converters, A/D converters, and RF/microwave/optical signal generators, transmitters, and receivers, whereby to send control signals 1132 to and receive readout signals 1134 from the qubit assembly, as appropriate for the physical scheme for the quantum computer. In some implementations, the input/output device 1126 can also include one or more network interface devices, e.g., an Ethernet card, a serial communication device, e.g., an RS-232 port, and/or a wireless interface device, e.g., an 802.11 card. In some implementations, the input/output device 1126 can include driver devices configured to receive input data and send output data to other external devices, e.g., keyboard, printer and display devices.

Although an example control and measurement system 1120 has been depicted in FIG. 11, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Figure 12:
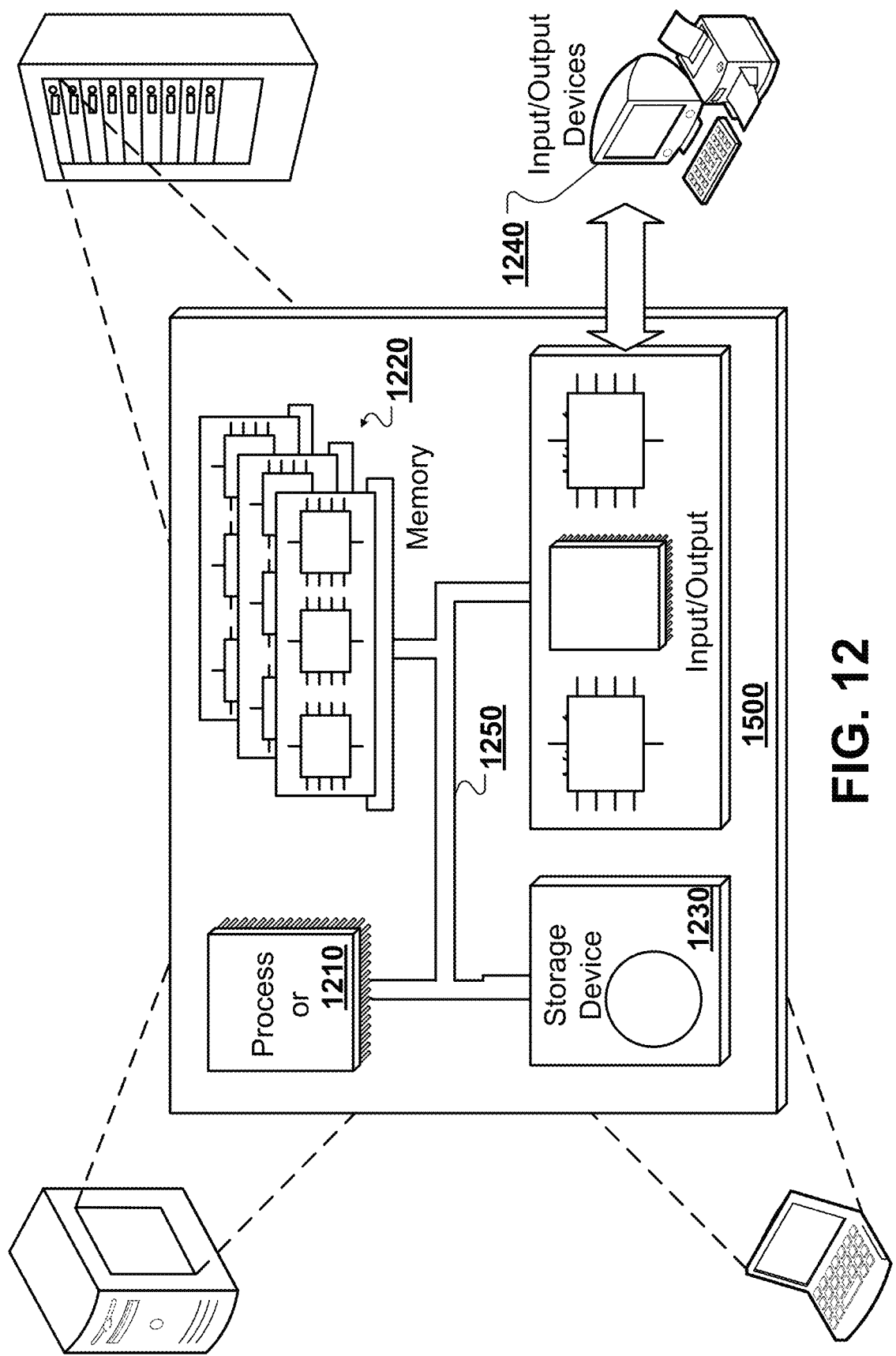
FIG. 12 shows an example classical processor that may be used to carry out the classical computing methods described herein.

FIG. 12 illustrates a schematic diagram of an exemplary generic classical processor system 1200. The system 1200 can be used for the classical operations described in this specification according to some implementations. The system 1200 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 1200 includes a processor 1210, a memory 1220, a storage device 1230, and an input/output device 1240. Each of the components 1210, 1220, 1230, and 1220 are interconnected using a system bus 1250. The processor 1210 may be enabled for processing instructions for execution within the system 1200. In one implementation, the processor 1210 is a single-threaded processor. In another implementation, the processor 1210 is a multi-threaded processor. The processor 1210 may be enabled for processing instructions stored in the memory 1220 or on the storage device 1230 to display graphical information for a user interface on the input/output device 1240.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 may be enabled for providing mass storage for the system 1200. In one implementation, the storage device 1230 is a computer-readable medium. In various different implementations, the storage device 1230 may be a floppy disk device, a hard disk device, an optical disk device, or a tape device.

The input/output device 1240 provides input/output operations for the system 1200. In one implementation, the input/output device 1240 includes a keyboard and/or pointing device. In another implementation, the input/output device 1240 includes a display unit for displaying graphical user interfaces.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a mark-up language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method for implementing a quantum swap operation on a first qubit and a second qubit, the method comprising:

establishing, by a first party and with a second party, an agreement to use a secure swap protocol to perform the quantum swap operation;

performing, by the first party and with the second party, the quantum swap operation, comprising, for each two-qubit gate included in the quantum swap operation:

performing, by the first party and according to the secure swap protocol, a respective preceding quantum gate cipher on the first qubit, wherein the preceding quantum gate cipher comprises a computational basis that anti-commutes with a computational basis of the two-qubit gate across a first axis of a Bloch sphere;

performing, by the first party and the second party, the two-qubit gate on the first qubit and the second qubit; and performing, by the first party and according to the secure swap protocol, a respective succeeding quantum gate cipher on the first qubit, wherein the succeeding quantum gate cipher comprises a computational basis that anti-commutes with a computational basis of the two-qubit gate across a second axis of the Bloch sphere.

2. The method of claim 1, wherein the method further comprises, after establishing the agreement to use the secure swap protocol to perform the quantum swap operation, performing, by the first party, a first commutation correction quantum operation to the first qubit, wherein the first commutation correction quantum operation corrects erroneous rotations of the first qubit.

3. The method of claim 1, wherein the method further comprises, after performing the quantum swap operation, performing, by the first party, a second commutation correction quantum operation to the first qubit, wherein the second commutation correction quantum operation corrects erroneous rotations of the first qubit.

4. The method of claim 1, further comprising, prior to implementing the quantum swap operation:
defining an initial quantum circuit with initial quantum gate ciphers;
adding quantum gates to the initial quantum gate ciphers to define an intermediate quantum circuit, wherein the intermediate quantum circuit is represented by a matrix with one of multiple acceptable forms, wherein a matrix has an acceptable form if the matrix i) includes four non-zero unitary-valued elements and twelve zero elements and ii) each row and column of the matrix includes one non-zero unitary-valued element.

5. The method of claim 4, further comprising adding correction quantum operations to the intermediate quantum circuit to produce a correct quantum circuit, wherein performing the correct quantum circuit implements a correct quantum swap operation.

6. The method of claim 1, wherein performing, by the first party, the two-qubit gate, comprises synchronizing with the second party to perform the two-qubit gate.

7. The method of claim 1, wherein the preceding quantum gate ciphers and the succeeding quantum gate ciphers performed by the first party are unknown to the second party.

8. The method of claim 1, wherein the preceding quantum gate ciphers and the succeeding quantum gate ciphers each comprise quantum gates that implement 120 degree and 180 degree rotations.

9. The method of claim 1, wherein the preceding quantum gate ciphers and the succeeding quantum gate ciphers vary for each two-qubit gate included in the quantum swap operation.

10. The method of claim 1, further comprising:
performing, by the second party and with the first party, the quantum swap operation, comprising, for each two-qubit gate included in the quantum swap operation:
performing, by the second party and according to the secure swap protocol, a respective preceding quantum gate cipher on the second qubit, wherein the preceding quantum gate cipher comprises a computational basis that anti-commutes with a computational basis of the two-qubit gate across a first axis of the Bloch sphere;
performing, by the second party and with the first party, the two-qubit gate; and
performing, by the second party and according to the secure swap protocol, a respective succeeding quantum gate cipher on the second qubit, wherein the succeeding quantum gate cipher comprises a computational basis that anti-commutes with a computational basis of the two-qubit gate across a second axis of the Bloch sphere.

11. The method of claim 1, wherein the agreement to use a secure swap protocol to perform the quantum swap operation is established using a secure private channel.

12. The method of claim 1, wherein the quantum swap operation comprises a SWAP gate or an iSWAP gate.

13. A system comprising:
one or more classical processors; and
quantum computing hardware;
wherein the system is configured to perform operations comprising:
establishing, by a first party and with a second party, an agreement to use a secure swap protocol to perform a quantum swap operation;
performing, by the first party and with the second party, the quantum swap operation, comprising, for each two-qubit gate included in the quantum swap operation:
performing, by the first party and according to the secure swap protocol, a respective preceding quantum gate cipher on a first qubit, wherein the preceding quantum gate cipher comprises a computational basis that anti-commutes with a computational basis of the two-qubit gate across a first axis of a Bloch sphere;
performing, by the first party and the second party, the two-qubit gate on the first qubit and a second qubit; and
performing, by the first party and according to the secure swap protocol, a respective succeeding quantum gate cipher on the first qubit, wherein the succeeding quantum gate cipher comprises a computational basis that anti-commutes with a computational basis of the two-qubit gate across a second axis of the Bloch sphere.

14. The system of claim 13, wherein the operations further comprise, after establishing the agreement to use the secure swap protocol to perform the quantum swap operation, performing, by the first party, a first commutation correction quantum operation to the first qubit, wherein the first commutation correction quantum operation corrects erroneous rotations of the first qubit.

15. The system of claim 13, wherein the operations further comprise, after performing the quantum swap operation, performing, by the first party, a second commutation correction quantum operation to the first qubit, wherein the second commutation correction quantum operation corrects erroneous rotations of the first qubit.

16. The system of claim 13, wherein the preceding quantum gate ciphers and the succeeding quantum gate ciphers each comprise quantum gates that implement 120 degree and 180 degree rotations.

17. The system of claim 13, wherein the preceding quantum gate ciphers and the succeeding quantum gate ciphers vary for each two-qubit gate included in the quantum swap operation.

18. The system of claim 13, wherein the agreement to use a secure swap protocol to perform the quantum swap operation is established using a secure private channel.

19. The system of claim 13, wherein the quantum swap operation comprises a SWAP gate or an iSWAP gate.

20. The system of claim 13, wherein the operations further comprise, prior to implementing the quantum swap operation:
defining an initial quantum circuit with initial quantum gate ciphers;
adding quantum gates to the initial quantum gate ciphers to define an intermediate quantum circuit, wherein the intermediate quantum circuit is represented by a matrix with one of multiple acceptable forms, wherein a matrix has an acceptable form if the matrix i) includes four non-zero unitary-valued elements and twelve zero elements and ii) each row and column of the matrix includes one non-zero unitary-valued element; and adding correction quantum operations to the intermediate quantum circuit to produce a correct quantum circuit, wherein performing the correct quantum circuit implements a correct quantum swap operation.

* * * * *